(12) United States Patent  (10) Patent No.: US 9,023,145 B2
Galembeck et al.  (45) Date of Patent: May 5, 2015

(54) ALUMINUM PHOSPHATE OR POLYPHOSPHATE COMPOSITIONS

(75) Inventors: Fernando Galembeck, Campinas (BR); Cesar Augusto Sales Barbosa, Campinas (BR); Melissa Braga, Campinas (BR)

(73) Assignee: Bunge Amorphic Solutions LLC, White Plains, NY (US)

( * ) Notice: Subject to any disclaimer, the term of this patent is extended or adjusted under 35 U.S.C. 154(b) by 730 days.

(21) Appl. No.: 12/368,867

(22) Filed: Feb. 10, 2009

(65) Prior Publication Data

US 2009/0217841 A1 Sep. 3, 2009

Related U.S. Application Data

(60) Provisional application No. 61/065,493, filed on Feb. 12, 2008.

(51) Int. Cl.
| | |
|---|---|
| *C04B 14/00* | (2006.01) |
| *C09C 1/40* | (2006.01) |
| *B82Y 30/00* | (2011.01) |
| *C01B 25/36* | (2006.01) |
| *C01B 25/40* | (2006.01) |
| *C08K 3/32* | (2006.01) |
| *C09D 5/02* | (2006.01) |

(Continued)

(52) U.S. Cl.
CPC . *C09C 1/40* (2013.01); *B82Y 30/00* (2013.01); *C01B 25/36* (2013.01); *C01B 25/40* (2013.01); *C01P 2004/64* (2013.01); *C01P 2006/10* (2013.01); *C01P 2006/22* (2013.01); *C08K 3/32* (2013.01); *C09D 5/028* (2013.01); *C09D 7/1216* (2013.01); *C09D 7/1266* (2013.01); *C09D 11/037* (2013.01)

(58) Field of Classification Search
USPC .................. 106/31.13, 287.17, 401
See application file for complete search history.

(56) References Cited

U.S. PATENT DOCUMENTS 1,654,404 A 12/1927 Blumenberg, Jr.
2,222,198 A * 11/1940 Fleck ......................... 162/181.2

(Continued)

FOREIGN PATENT DOCUMENTS

BR IP 9500522-6 6/2002
BR IP 9400746-2 7/2003

(Continued)

OTHER PUBLICATIONS

Chemical Book. CAS DataBase List. "Sodium Polyphosphate" (2010). http://www.chemicalbook.com/ChemicalProductProperty_EN_CB0278207.htm.*

(Continued)

*Primary Examiner* — Kaj K Olsen
*Assistant Examiner* — Ross J Christie
(74) *Attorney, Agent, or Firm* — Snell & Wilmer L.L.P.

(57) ABSTRACT

Slurry composition comprising amorphous aluminum phosphate, polyphosphate orthophosphate, metaphosphate and/or combination thereof and a dispersant are described. In certain embodiments, the polyphosphate orthophosphate and/or metaphosphate concentration is about 40 to about 70 weight % and the dispersant concentration is less than about 3.5 weight % based on the total weight of the slurry. In one embodiment, the composition is useful in paints, varnishes, printing inks, papers and plastics. The compositions can be used as a substitute for titanium dioxide in various applications.

36 Claims, 2 Drawing Sheets

(51) Int. Cl.
   *C09D 7/12*    (2006.01)
   *C09D 11/037*  (2014.01)

(56) References Cited

U.S. PATENT DOCUMENTS

| | | | |
|---|---|---|---|
| 2,222,199 A * | 11/1940 | Fleck | 162/181.2 |
| 2,909,451 A * | 10/1959 | Vartanian et al. | 106/286.5 |
| 3,394,987 A | 7/1968 | Lee et al. | |
| 3,650,683 A | 3/1972 | Hloch et al. | |
| 3,737,333 A * | 6/1973 | Sawyer, Jr. | 106/487 |
| 3,801,704 A | 4/1974 | Kobayashi et al. | |
| 3,926,905 A | 12/1975 | Nose et al. | |
| 3,943,231 A | 3/1976 | Wasel-Nielen et al. | |
| 4,015,050 A | 3/1977 | Birchall | |
| 4,054,678 A | 10/1977 | Benjamin et al. | |
| 4,076,221 A | 2/1978 | Gröger | |
| 4,078,028 A | 3/1978 | Kishi | |
| 4,098,749 A | 7/1978 | Hoshino et al. | |
| 4,111,884 A | 9/1978 | Takase et al. | |
| 4,122,231 A | 10/1978 | Kishi | |
| 4,127,157 A | 11/1978 | Gardikes et al. | |
| 4,138,261 A | 2/1979 | Adrian et al. | |
| 4,147,758 A | 4/1979 | Adrian et al. | |
| 4,169,802 A | 10/1979 | Basile et al. | |
| 4,171,984 A | 10/1979 | Hosaka et al. | |
| 4,216,190 A | 8/1980 | Neely, Jr. | |
| 4,227,932 A | 10/1980 | Leah et al. | |
| 4,260,591 A | 4/1981 | Benjamin et al. | |
| 4,289,863 A * | 9/1981 | Hill et al. | 526/106 |
| 4,319,926 A | 3/1982 | Nowakowski et al. | |
| 4,321,244 A | 3/1982 | Magnier et al. | |
| 4,328,033 A | 5/1982 | Boberski et al. | |
| 4,329,327 A | 5/1982 | Neely, Jr. et al. | |
| 4,333,914 A | 6/1982 | Neely, Jr. et al. | |
| 4,364,854 A | 12/1982 | McDaniel et al. | |
| 4,364,855 A | 12/1982 | McDaniel et al. | |
| 4,375,496 A | 3/1983 | Nowakowski et al. | |
| 4,383,866 A | 5/1983 | Nowakowski et al. | |
| 4,395,387 A | 7/1983 | Goltz et al. | |
| 4,418,048 A | 11/1983 | Dyer et al. | |
| 4,435,219 A | 3/1984 | Greigger | |
| 4,444,962 A | 4/1984 | McDaniel et al. | |
| 4,444,965 A | 4/1984 | McDaniel et al. | |
| 4,482,380 A | 11/1984 | Schlegel | |
| 4,487,862 A | 12/1984 | Maruya | |
| 4,504,555 A * | 3/1985 | Prior et al. | 106/690 |
| 4,505,954 A | 3/1985 | Hokamura et al. | |
| 4,518,513 A | 5/1985 | Lochner et al. | |
| 4,542,001 A | 9/1985 | Iino et al. | |
| 4,547,479 A | 10/1985 | Johnson et al. | |
| 4,567,152 A | 1/1986 | Pine | |
| 4,592,966 A * | 6/1986 | Prior et al. | 428/689 |
| 4,597,796 A | 7/1986 | Ernst et al. | |
| 4,604,318 A * | 8/1986 | Prior et al. | 106/691 |
| 4,622,371 A | 11/1986 | McDaniel | |
| 4,640,964 A | 2/1987 | Johnson et al. | |
| 4,673,663 A | 6/1987 | Magnier | |
| 4,717,701 A | 1/1988 | McDaniel | |
| 4,743,572 A | 5/1988 | Angevine et al. | |
| 4,746,568 A | 5/1988 | Matsumoto et al. | |
| 4,758,281 A | 7/1988 | Eckler et al. | |
| 4,767,802 A | 8/1988 | Sakakibara et al. | |
| 4,782,109 A | 11/1988 | DuLaney et al. | |
| 4,876,097 A | 10/1989 | Autant et al. | |
| 4,888,056 A | 12/1989 | van der Kolk et al. | |
| 4,898,660 A | 2/1990 | Wilson et al. | |
| 4,972,002 A | 11/1990 | Volkert | |
| 4,990,217 A | 2/1991 | Philippot et al. | |
| 4,996,103 A | 2/1991 | Henn et al. | |
| 5,028,684 A | 7/1991 | Neuhaus et al. | |
| 5,030,431 A | 7/1991 | Glemza | |
| 5,077,332 A | 12/1991 | Blattler et al. | |
| 5,096,933 A | 3/1992 | Volkert | |
| 5,108,755 A | 4/1992 | Daniels et al. | |
| 5,158,610 A | 10/1992 | Bittner | |
| 5,183,656 A | 2/1993 | Uesaka et al. | |
| 5,208,271 A | 5/1993 | Gallagher | |
| 5,242,744 A | 9/1993 | Schryer | |
| 5,256,253 A | 10/1993 | Zidovec et al. | |
| 5,296,027 A | 3/1994 | Ernst et al. | |
| 5,374,411 A | 12/1994 | Davis et al. | |
| 5,403,519 A | 4/1995 | Rittler et al. | |
| 5,486,232 A | 1/1996 | Griffith et al. | |
| 5,488,016 A | 1/1996 | Rittler et al. | |
| 5,496,529 A | 3/1996 | Fogel et al. | |
| 5,534,130 A | 7/1996 | Sekhar | |
| 5,552,361 A | 9/1996 | Rieser et al. | |
| 5,584,925 A * | 12/1996 | Maxwell et al. | 106/486 |
| 5,698,758 A | 12/1997 | Rieser et al. | |
| 5,707,442 A | 1/1998 | Fogel et al. | |
| 5,763,015 A | 6/1998 | Hasui et al. | |
| 5,783,510 A | 7/1998 | Kida et al. | |
| 5,883,200 A | 3/1999 | Tsuchiya et al. | |
| 6,010,563 A | 1/2000 | Taketani et al. | |
| 6,022,513 A | 2/2000 | Pecoraro et al. | |
| 6,117,373 A | 9/2000 | Kida et al. | |
| 6,139,616 A | 10/2000 | Nagayama et al. | |
| 6,177,489 B1 | 1/2001 | Okuse et al. | |
| 6,306,209 B1 * | 10/2001 | Woodworth et al. | 106/401 |
| 6,316,532 B1 | 11/2001 | Nozaki et al. | |
| 6,342,546 B1 | 1/2002 | Kato et al. | |
| 6,409,951 B1 | 6/2002 | Inoue et al. | |
| 6,447,741 B1 | 9/2002 | Chester et al. | |
| 6,461,415 B1 | 10/2002 | Sambasivan et al. | |
| 6,503,304 B2 | 1/2003 | Korn et al. | |
| 6,547,870 B1 | 4/2003 | Griessmann et al. | |
| 6,562,474 B1 | 5/2003 | Yoshimi et al. | |
| 6,589,324 B2 | 7/2003 | Kamo et al. | |
| 6,635,192 B1 | 10/2003 | Schwarz | |
| 6,646,058 B1 | 11/2003 | Koger | |
| 6,669,816 B1 | 12/2003 | Poch et al. | |
| 6,677,053 B2 | 1/2004 | Yamaji et al. | |
| 6,749,769 B2 | 6/2004 | Gai | |
| 6,784,236 B2 | 8/2004 | Sugita et al. | |
| 6,797,155 B1 | 9/2004 | Chester et al. | |
| 6,838,506 B2 | 1/2005 | Nakao et al. | |
| 6,881,782 B2 | 4/2005 | Crater et al. | |
| 6,927,185 B2 | 8/2005 | Yamanaka et al. | |
| 7,101,820 B2 | 9/2006 | Gai | |
| 7,264,672 B1 * | 9/2007 | Trabzuni et al. | 106/443 |
| 7,311,944 B2 | 12/2007 | Sambasivan et al. | |
| 7,438,881 B2 | 10/2008 | Staffel et al. | |
| 7,678,465 B2 | 3/2010 | Sambasivan et al. | |
| 7,682,700 B2 | 3/2010 | Sambasivan et al. | |
| 2001/0031316 A1 | 10/2001 | Nozaki et al. | |
| 2002/0031679 A1 | 3/2002 | Yano et al. | |
| 2002/0040557 A1 | 4/2002 | Felton | |
| 2002/0158230 A1 | 10/2002 | Bortnik | |
| 2003/0113486 A1 | 6/2003 | Sakai et al. | |
| 2003/0138673 A1 | 7/2003 | Sambasivan et al. | |
| 2004/0011245 A1 | 1/2004 | Sambasivan et al. | |
| 2004/0063815 A1 | 4/2004 | Kinose et al. | |
| 2004/0071887 A1 | 4/2004 | Newton | |
| 2004/0092637 A1 | 5/2004 | McClanaham | |
| 2004/0138058 A1 | 7/2004 | Sambasivan et al. | |
| 2004/0261909 A1 | 12/2004 | Hamada | |
| 2005/0106384 A1 | 5/2005 | Sambasivan et al. | |
| 2006/0045831 A1 * | 3/2006 | Galembeck et al. | 423/311 |
| 2006/0057407 A1 | 3/2006 | Sambasivan et al. | |
| 2006/0211798 A1 * | 9/2006 | Galembeck et al. | 106/401 |
| 2007/0215005 A1 | 9/2007 | Nicolai et al. | |
| 2007/0269650 A1 * | 11/2007 | Leuninger et al. | 106/286.2 |
| 2008/0038556 A1 | 2/2008 | Galembeck et al. | |
| 2008/0085965 A1 | 4/2008 | Imakita et al. | |
| 2009/0064893 A1 | 3/2009 | Sambasivan et al. | |
| 2009/0149317 A1 | 6/2009 | Stamires et al. | |
| 2010/0180801 A1 | 7/2010 | Thauern et al. | |
| 2011/0301272 A1 * | 12/2011 | Galembeck et al. | 524/417 |

FOREIGN PATENT DOCUMENTS

| | | |
|---|---|---|
| BR | IP 9104581-9 | 8/2003 |
| EP | 492 137 | 11/1991 |
| EP | 598 464 | 5/1994 |

(56) References Cited

FOREIGN PATENT DOCUMENTS

| | | |
|---|---|---|
| EP | 0 753 546 A2 | 1/1997 |
| EP | 0 837 031 | 4/1998 |
| EP | 1 241 131 | 9/2002 |
| EP | 1878700 | 1/2008 |
| GB | 0 517 258 | 1/1940 |
| GB | 1 379 562 A | 1/1975 |
| GB | 1403242 | 8/1975 |
| GB | 2 038 791 | 12/1979 |
| GB | 2 042 573 A | 9/1980 |
| JP | 53-19345 | 1/1978 |
| JP | 53-59725 | 5/1978 |
| JP | 55-160059 | 12/1980 |
| JP | 56-32553 | 4/1981 |
| JP | 56-32554 | 4/1981 |
| JP | 56-32555 | 4/1981 |
| JP | 56-32556 | 4/1981 |
| JP | 56-131671 | 10/1981 |
| JP | 57-158267 | 9/1982 |
| JP | 60-215091 | 10/1985 |
| JP | 61-101566 | 5/1986 |
| JP | 61-286209 | 12/1986 |
| JP | 62-4753 | 1/1987 |
| JP | 63-101454 | 5/1988 |
| JP | 1-110567 | 4/1989 |
| JP | 1-167381 | 7/1989 |
| JP | 1-234475 | 9/1989 |
| JP | 1-249638 | 10/1989 |
| JP | 4-90874 | 3/1993 |
| JP | 6-179866 | 6/1994 |
| JP | 6-286054 | 10/1994 |
| JP | 7-241954 | 9/1995 |
| JP | 7-330451 | 12/1995 |
| JP | 8-72197 | 3/1996 |
| JP | 8-268704 | 10/1996 |
| JP | 8-283619 | 10/1996 |
| JP | 10-139923 | 5/1998 |
| JP | 10-213374 | 8/1998 |
| JP | 10-235782 | 9/1998 |
| JP | 11-147261 | 2/1999 |
| JP | 2001-189127 | 4/2001 |
| JP | 2001-329221 | 11/2001 |
| WO | 2006024959 | 3/2006 |
| WO | WO 2006-024959 | 3/2006 |
| WO | 2007104465 A2 | 9/2007 |
| WO | 2008017135 | 2/2008 |

OTHER PUBLICATIONS

Material Safety Data Sheet for Sodium Tripolyphosphate (also known as Triphosphoric acid, pentasodium salt), ScienceLab.com (Oct. 11, 2005).*

Chemical Book, CAS DataBase List, "Trisodium Phosphate Dodecahydrate", http://www.chemicalbook.com/ChemicalProductProperty_EN_CB5700750.htm.*

Beppu, M.M., Lima, E.C.O., and Galembeck, F., Aluminum Phosphate Particles Containing Closed Pores: Preparation, Characterization, and Use as a White Pigment, Journal of Colloid and Interface Science 178, 93-103 (1996), Article No. 0097.

Beppu, M.M., Lima, E.C.O., Sassaki, R.M., and Galembeck, F., Self-Opacifying Aluminum Phosphate Particles for Paint Film Pigmentation, Journal of Coatings Technlogy, Vo. 69, No. 867, 81-88, Apr. 1997.

Burrell, L.S., Johnston, C.T., Schulze, D. Klein, J. White, J.L. and Hem. S.L., Aluminum Phosphate Adjuvants Prepared by Precipitation of Constant pH. Part 1: Composition and Structure, Vaccine 19 (2001) 275-281.

Burrell, L.S., Johnston, C.T., Schulze, D. Klein, J. White, J.L. and Hem. S.L., Aluminum Phosphate Adjuvants Prepared by Precipitation of Constant pH. Part 11: Physicochemical Properties, Vaccine 19 (2001) 282-287.

Rosseto, R., Dos Santos, A.C.M.A., and Galembeck, F., Hydrous Non-Crystalline Phosphates: Structure, Function and a new White Pigment, J. Braz. Chem. Soc., vol. 17, No. 8, 1465-1472, 2006, printed in Brazil, XP-002432072.

Extended European Search report dated May 4, 2007 (European Application No. 07003938.3-2102).

Filho, P.P.A., and Galembeck, F., Genesis of a Solid Foam: Iron (III) Metaphosphate Transformation in Sol-Gel Crystallization processes, Langmuir 1990, 6, 1013-1016.

International Search Result completed Feb. 17, 2006; and Written Opinion (PCT/US/IB2005/003349).

Lima, E.C.O., and Galembeck, F., Particles of Sluminum Metaphosphate Containing Closed Pores. Preparation, Characterization and Optical Properties, Colloids and Surfaces A: Physicochemical and Engineering Aspects, 75 (1993) 65-74.

Lima, E.C.O., Beppu, M.M., and Galembeck, F., Nanosized Particles of Aluminum Polyphosphate, Langmuir, vol. 12, No. 7, pp. 1701-1703.

Lima, E.C.O., Beppu, M.M., Galembeck, F., Filho, J.F.V., and Soares, D.M., Non-Crystalline Aluminum Polyphosphates: Preparation and Properties, J. Braz. Chem. Soc., vol. 7, No. 3, 209-215, 1996, printed in Brazil.

Monteiro, V.A.R., Souza, E.F., Azevedo, M.M.M., and Galembeck, F., Aluminum Polyphosphate Nanoparticles: Preparation, Particle Size Determination, and Microchemistry, Journal of Colloid and Interface Science 217, 237-248 (1999), Article ID jcis, 1999,6381.

Souza, E.F., and Galembeck, F., Formation of Opaque Films by Biomimetic Process, Journal of Material Science 32 (1997) 2207-2213.

Souza, E.F., Silva, M.D.C., and Galembeck, F., Improved Latex Film—Glass Adhesion Under Wet Environments by Using and Aluminum Polyphosphate Fillwer, [publication], 358-377 (1998).

Yang, H., Walton, R.I., Biedasek, S., Antonijevic, S., and Wimperis, S., Experimental Observations of Water—Framework Interactions in a Hydrated Microporous Aluminum Phosphate, J. Phys. Chem. B. 2005, 109, 4464-4469.

English Abstract of document B01: BR 199104581-9.
English Abstract of document B02: BR 199400746-2.
English Abstract of document B03: BR 199500522-6.
English Abstract of document B04: EP 1 241 131.
English Abstract of document B07: EP 0 837 031.

International Preliminary Examination Report of corresponding International Application No. PCT/BR2009/000034 dated May 12, 2010; total 13 pages.

International Search Report and Written Opinion of corresponding International Application No. PCT/BR2009/000034 dated Nov. 11, 2009, total 15 pages.

Faison et al.; Use of Polyphosphates as Deflocculants of Alumina; Ceramic Engineering & Science Proceedings; vol. 12[1-2]; 1991; pp. 106-115.

* cited by examiner

ALUMINUM PHOSPHATE OR POLYPHOSPHATE COMPOSITIONS

PRIOR RELATED APPLICATIONS

This application claims priority to U.S. Provisional Application No. 61/065,493 filed on Feb. 12, 2008. For the purposes of United States patent practice, the contents of the provisional patent application are incorporated by reference herein in their entirety.

FIELD OF THE INVENTION

Provided herein are compositions in form of a slurry comprising aluminum phosphate, aluminum orthophosphate, aluminum metaphosphate, aluminum polyphosphate or combinations thereof and a dispersant. Aluminum phosphate, aluminum orthophosphate, aluminum metaphosphate, or aluminum polyphosphate particles in the slurry are characterized by one or more voids. Further provided are uses of such compositions in paint and other applications.

BACKGROUND OF INVENTION

Titanium dioxide pigment is the most widely used white pigment in paint due to its strong ability to backscatter visible light, which is in turn dependent on its refractive index. Substitutes for titanium dioxide have been sought, but the refractive indexes of the anatase and rutile forms of titanium dioxide are much higher than those of any other white powder, due to structural reasons.

Titanium dioxide pigments are insoluble in coating vehicles in which they are dispersed. The performance properties of such titanium dioxide pigments, including its physical and chemical characteristics, are determined by the particle size of the pigment and the chemical composition of its surface. The decorative and functional abilities of titanium dioxide are due to its scattering power that make it a highly desirable pigment. However, titanium dioxide is known to be an expensive pigment to manufacture. Accordingly, there is a need for a more affordable substitute for titanium dioxide as a pigment.

Amorphous aluminum phosphate particles are reported in the literature as a substitute for titanium dioxide white pigment in paints and other applications. For example, see, U.S. patent publication nos. 2006/0211798 and 2006/0045831 and 2008/00038556. The disclosures of these patent applications is incorporated by reference in their entirety herein.

There is a continuing need to develop efficient and cost-effective compositions of amorphous aluminum phosphate.

SUMMARY OF THE INVENTION

Provided herein is a composition in form of a slurry comprising aluminum phosphate, aluminum orthophosphate, aluminum metaphosphate, aluminum polyphosphate particles or a mixture thereof and a dispersant. Also provided is a process for making the compositions. The aluminum phosphate, aluminum orthophosphate, aluminum metaphosphate or aluminum polyphosphate particles in the slurry are characterized by one or more voids per particle of amorphous aluminum phosphate, aluminum metaphosphate, aluminum orthophosphate or aluminum polyphosphate when in powder form. In one embodiment, the aluminum phosphate, aluminum metaphosphate, aluminum orthophosphate or aluminum polyphosphate particles in the slurry are characterized by one to four voids per particle of amorphous aluminum phosphate, aluminum metaphosphate, aluminum orthophosphate or aluminum polyphosphate when in powder form. In certain embodiments, the amorphous aluminum phosphate, aluminum metaphosphate, aluminum orthophosphate or aluminum polyphosphate in the slurry is characterized by a skeletal density of between about 1.95 and 2.50 grams per cubic centimeter. In certain embodiments, amorphous aluminum phosphate, aluminum metaphosphate, aluminum orthophosphate or aluminum polyphosphate in the slurry has a phosphorus to aluminum mole ratio of about 0.5 to 1.75, 0.65 to 1.75, 0.5 to 1.5 or 0.8 to 1.3. In one embodiment, amorphous aluminum phosphate, aluminum metaphosphate, aluminum orthophosphate or aluminum polyphosphate in the slurry has a phosphorus to aluminum mole ratio of about 0.5 to 1.5 or 0.8 to 1.3. In powder form, the amorphous aluminum phosphate, aluminum metaphosphate, aluminum orthophosphate or aluminum polyphosphate may comprise an average individual particle radius size of between about 5 and 80 nanometers. In certain embodiments, the amorphous aluminum phosphate, aluminum metaphosphate, aluminum orthophosphate or aluminum polyphosphate may comprise an average individual particle radius size of between about 10 to 80, 20 to 80, 30 to 80, 10 to 50, or 10 to 40 nanometers, when in powder form.

Without being bound to any particular theory it is believed that the dispersants in the slurry compositions allow to achieve higher concentrations of non-volatiles, for example, in certain embodiments, more than about 40 or 50 weight % non-volatiles based on the total weight of the slurry or in other embodiments or more than about 40 or 50 weight % aluminum phosphate, aluminum metaphosphate, aluminum orthophosphate or aluminum polyphosphate, or combination thereof, based on the total weight of the slurry. In certain aspects, the slurry compositions comprising dispersants exist as viscous liquids with a viscosity suitable for the desired applications, for example, use of the slurry compositions in paints. In certain embodiments, the dispersions of aluminum phosphate, aluminum metaphosphate, aluminum orthophosphate or aluminum polyphosphate without dispersants, exhibit low viscosity at lower non-volatile concentrations, for example, lower than or about 35 weight % non-volatiles based on the total weight of the slurry. In other embodiments, the dispersions of aluminum phosphate, aluminum metaphosphate, aluminum orthophosphate or aluminum polyphosphate without dispersants, exhibit high viscosity at higher non-volatile concentrations, for example, higher than or about 35 weight % non-volatiles based on the total weight of the slurry. Such highly viscous slurry is not suitable for use in, for example, paint applications and other applications. In certain embodiments, slurries comprising lower concentrations of non-volatiles or lower concentrations of aluminum phosphate, aluminum metaphosphate, aluminum orthophosphate or aluminum polyphosphate and combinations thereof, settle thereby producing hard-packed sediment that is not easily dispersed.

In certain embodiments, the amorphous aluminum phosphate, aluminum metaphosphate, aluminum orthophosphate or aluminum polyphosphate in the slurry further comprises an ion, such as sodium, lithium, calcium, potassium, borate, ammonium or a combination thereof. In certain embodiments, the ion is selected from sodium, potassium and lithium ion. In one embodiment, the ion is sodium ion. In certain embodiment, the slurry comprises sodium aluminum phosphate, sodium aluminum metaphosphate, sodium aluminum orthophosphate or sodium aluminum polyphosphate or a mixture thereof and a dispersant or a mixture of dispersants.

The slurry comprising aluminum phosphate, aluminum metaphosphate, aluminum orthophosphate or aluminum polyphosphate or a mixture thereof may be used as an ingredient in a paint. In certain embodiments, the slurry is used as a substitute (in part or in whole) for titanium dioxide. The slurry may also be used as an ingredient in a varnish, printing ink, paper or plastic.

DESCRIPTION OF EMBODIMENTS OF THE INVENTION

Figure 1:
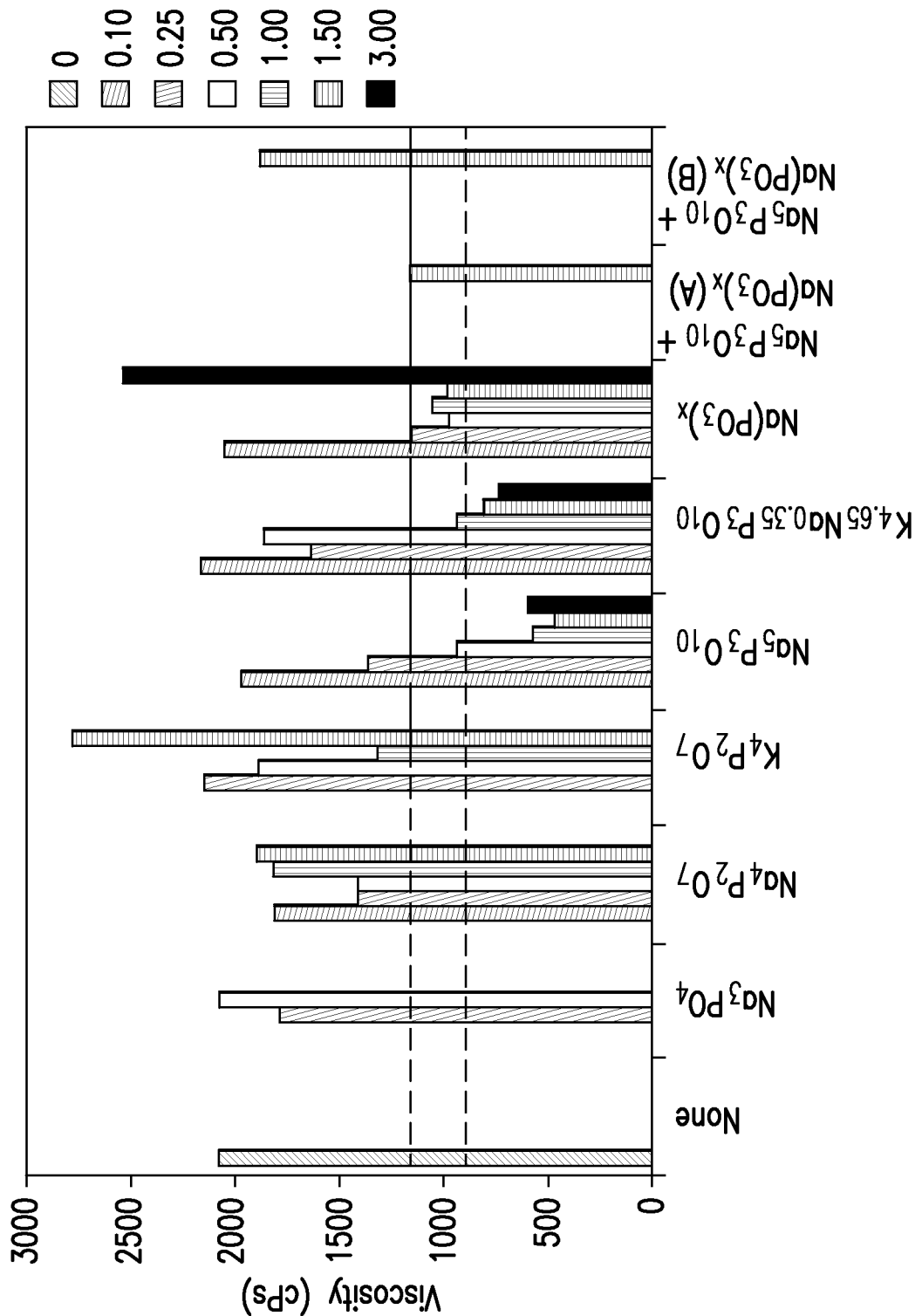
FIG. 1: Effects of dispersant type and concentration on 51% aluminum phosphate slurry viscosities at 100 s$^{-1}$. The dashed lines indicate the interval of low viscosity without sedimentation (900-1150 cPs).

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$ and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

Provided herein is an aluminum phosphate composition in a slurry form comprising aluminum phosphate, aluminum orthophosphate, aluminum metaphosphate or aluminum polyphosphate, or a mixture thereof and a dispersant. The term "aluminum phosphate" as used herein, is meant to include aluminum phosphate, aluminum orthophosphate, aluminum metaphosphate or aluminum polyphosphate, and mixtures thereof.

The term "slurry" as used herein refers to a homogeneous suspension or dispersion comprising non-volatile particles, including aluminum phosphate, aluminum orthophosphate, aluminum metaphosphate or aluminum polyphosphate, and/or mixtures thereof in a solvent. In certain embodiments, the solvent comprises or is water. In certain embodiments, the slurry comprises more than 30, 40, 50, 60 or 70 weight % non-volatile particles, including aluminum phosphate, aluminum orthophosphate, aluminum metaphosphate or aluminum polyphosphate and/or mixtures thereof based on the total weight of the slurry. In some embodiments, the particles suspended or dispersed in a solvent (such as water) form a colloidal solution, which is stable over a relatively long period of time. A colloidal solution is a colloid that has a continuous liquid phase in which a solid is suspended in a liquid.

The term "void" referred to herein is generally synonymous with the term "hollow particle," and is also described herein as a "closed void." The void (or closed void or hollow particle) is part of a core and shell structure of the aluminum phosphate mixture. The voids may be observed and/or characterized using either transmission or scanning electron microscopes ("TEMs" or "SEMs"). The use of TEMs or SEMs are well known to those of skill in the art. Generally, optical microscopy is limited, by the wavelength of light, to resolutions in the range of a hundred, and usually hundreds, of nanometers. TEMs and SEMs do not have this limitation and are able to attain a considerably higher resolution, in the range of a few nanometers. An optical microscope uses optical lenses to focus light waves by bending them, while an electron microscope uses electromagnetic lenses to focus beams of electrons by bending them. Beams of electrons provide great advantages over beams of light both in control of magnification levels and in the clarity of the image that can be produced. Scanning electron microscopes complement transmission electron microscopes in that they provide a tool to obtain the three dimensional image of the surface of a sample.

Amorphous (i.e., non-crystalline) solids exhibit differences from their crystalline counterparts with a similar composition, and such differences may yield beneficial properties. For example, such differences may include one or more of the following: (i) the non-crystalline solids do not diffract x-rays at sharply defined angles but may produce a broad scattering halo instead; (ii) the non-crystalline solids do not have well defined stoichiometry, thus they can cover a broad range of chemical compositions; (iii) the variability of chemical composition includes the possibility of incorporation of ionic constituents other than aluminum and phosphate ions; (iv) as amorphous solids are thermodynamically meta-stable, they may demonstrate a tendency to undergo spontaneous morphological, chemical and structural changes; and (v) the chemical composition of crystalline particle surface is highly uniform while the chemical composition of surface of amorphous particles may show large or small differences, either abrupt or gradual. In addition, while particles of crystalline solids tend to grow by the well-known mechanism of Ostwald ripening, non-crystalline particles may expand or swell and shrink (de-swell) by water sorption and desorption, forming a gel-like or plastic material that is easily deformed when subjected to shearing, compression or capillary forces.

The aluminum phosphate particles in the slurry are characterized by one or more voids per particle of amorphous aluminum phosphate when in powder form. In one embodiment, the aluminum phosphate particles in the slurry are characterized by one to four voids per particle of amorphous aluminum phosphate when in powder form.

In certain embodiments, the aluminum phosphate particles in the slurry are characterized by a skeletal density of about 1.73-2.40 g/cm$^3$. In one embodiment, the skeletal density is less than 2.40 g/cm$^3$. In another embodiment, the skeletal density is less than 2.30 g/cm$^3$. In another embodiment, the skeletal density is less than 2.10 g/cm$^3$. In yet another embodiment the skeletal density is less than 1.99 g/cm$^3$. In one embodiment, the amorphous aluminum phosphate in the slurry is characterized by a skeletal density of about 1.95, 1.98, 2.00, or 2.25 grams per cubic centimeter.

In one embodiment, amorphous aluminum phosphate in the slurry has a phosphorus to aluminum mole ratio of about 0.5 to 1.5. In another embodiment, amorphous aluminum phosphate in the slurry has a phosphorus to aluminum mole ratio of about 0.8 to 1.3. In certain embodiments, the phosphorus to aluminum mole ratio is about 0.5, 0.6, 0.7, 0.8, 0.9, 1.0, 1.1, 1.2, 1.3, 1.4 or 1.5. In further embodiments, the phosphorus to aluminum mole ratio is about 0.8, 0.9, 1.0, 1.1, 1.2 or 1.3.

In powder form, the amorphous aluminum phosphate may comprise an average individual particle radius size of between about 5 and 80 nanometers. In certain embodiments, the amorphous aluminum phosphate may comprise an average individual particle radius size of between about 5 and 40, 10 and 80, 10 and 40, 20 and 80 or 20 and 40 nanometers.

In certain embodiments, when the aluminum phosphate, polyphosphate orthophosphate and/or metaphosphate is in powder form, samples subjected to a differential scanning calorimetry test will demonstrate two distinct endothermic peaks, the peaks occurring generally between 90° Celsius and 250° Celsius. In one embodiment, the first peak occurs at approximately between the temperatures of approximately 96° Celsius and 116° Celsius, and the second peaks occurs at approximately between the temperatures of 149° Celsius and 189° Celsius. In another embodiment, the two peaks occur at approximately 106° Celsius and approximately 164° Celsius.

In certain embodiments, the slurry compositions provided herein comprise from about 40% up to about 70% of non-volatiles by weight measured according to ASTM D280. In certain embodiments, the slurry comprises from about 40 wt % up to about 60 wt % non-volatiles based on the total weight. In one embodiment, the slurry comprises from about 50 wt % up to about 60 wt % non-volatiles based on the total weight. In other embodiments, the slurry comprises about 20, 30, 40, 45, 47, 48, 49, 50, 51, 52, 53, 54, 55, 56, 57, 58, 59 or 60 wt % or more of non-volatile solids based on the total weight. In another embodiment, the slurry comprises about 51, 53 or 58 wt % non-volatiles based on the total weight.

In certain embodiments, the slurry comprises about 25 wt % up to about 70 wt % aluminum phosphate by weight. In certain embodiments, the slurry comprises about 40% up to about 60 wt % aluminum phosphate based on the total weight. In one embodiment, the slurry comprises from about 50 wt % up to about 60 wt % aluminum phosphate based on the total weight. In another embodiment, the slurry comprises 20, 30, 40, 45, 47, 48, 49, 50, 51, 52, 53, 54, 55, 56, 57, 58, 59 or 60 wt % or more of aluminum phosphate based on the total weight. In one embodiment, the slurry comprises about 51, 53 or 58 wt % aluminum phosphate based on the total weight.

In certain embodiments, the aluminum phosphate slurry provided herein has a viscosity ranging from about 300 cPs up to about 3500 cPs measured at 100-500 s$^{-1}$ shear rates (measured using a Rheoterm 115 Rheometer, as described in Example 3). In other embodiments, the aluminum phosphate slurry provided herein has a viscosity ranging from about 550 cPs up to about 3000 cPs at 100 s$^{-1}$ shear rate. In one embodiment the aluminum phosphate slurry provided herein has a viscosity ranging from about 900 cPs up to about 1150 cPs at 100/see shear rate. In another embodiment, the aluminum phosphate slurry provided herein has a viscosity of about 300, 400, 500, 600, 700, 800, 900, 1000, 1200, 1400, 1600, 1800, 2000, 2200, 2400, 2600, 2800 or 3000 cPs measured at 100-500 s$^{-1}$ shear rates.

The dispersant in the aluminum phosphate slurry provided herein is selected from phosphate dispersants, including inorganic and organic phosphates, borate dispersants, silicate dispersants, aluminate dispersants, any anionic or non-ionic surfactant or soluble polymer or oligomer known to one of skill in the art and any combination thereof.

In certain embodiments, the dispersant is selected from tetrasodium pyrophosphate (TSPP), sodium hexametaphosphate, pentasodium triphosphate, trisodium phosphate dodecahydrate, tetrapotassium pyrophosphate (TKPP), sodium potassium triphosphate or a combination thereof. In one embodiment, the dispersant concentration in the aluminum phosphate slurry compositions provided herein is less than about 3.5 weight % based on the total weight of the slum. In another embodiment, the dispersant concentration in the aluminum phosphate slurry compositions provided herein is less than about 3, 2.5, 2, 1.5 or 1 weight % based on the total weight of the slurry.

In one embodiment, the aluminum phosphate slurry composition provided herein comprises from about 50 weight % to about 60 weight % aluminum phosphate and less than about 3, 2.5, 2, 1.5 or 1 weight % dispersant based on the total weight of the slurry.

In one embodiment, the dispersant in the aluminum phosphate slurry composition provided herein comprises trisodium phosphate dodecahydrate in a concentration of about 0.10 to about 1.00 weight % based on the total weight of the slurry. In another embodiment, the dispersant in the aluminum phosphate slurry composition provided herein comprises trisodium phosphate dodecahydrate in a concentration of about 0.20 to about 0.75 weight % based on the total weight of the slurry. In yet another embodiment, the dispersant in the aluminum phosphate slurry composition provided herein comprises trisodium phosphate dodecahydrate in a concentration of about 0.20 to about 0.50 weight % based on the total weight of the slurry. In a further embodiment, the dispersant in the aluminum phosphate slurry composition provided herein comprises trisodium phosphate dodecahydrate in a concentration of about 0.20, 0.22, 0.24, 0.27, 0.30, 0.35, 0.40, 0.45, 0.50, 0.55, 0.60 or 0.75 weight % based on the total weight of the slurry.

In one embodiment, the aluminum phosphate slurry composition provided herein comprises from about 50 weight % to about 60 weight % aluminum phosphate and less than about 2 or less than about 1 weight % trisodium phosphate dodecahydrate based on the total weight of the slurry. In one embodiment, the aluminum phosphate slurry composition provided herein comprises from about 50 weight % to about 60 weight % aluminum phosphate and about 0.20 weight % to about 0.75 weight % trisodium phosphate dodecahydrate based on the total weight of the slurry. In another embodiment, the aluminum phosphate slurry composition provided herein comprises about 51, 53 or 58 weight % aluminum phosphate and about 0.24 or about 0.50 weight % trisodium phosphate dodecahydrate based on the total weight of the slurry. In a further embodiment, the aluminum phosphate slurry composition provided herein comprises about 51 weight % aluminum phosphate and about 0.24 or about 0.50 weight % trisodium phosphate dodecahydrate based on the total weight of the slurry.

In another embodiment, the dispersant in the aluminum phosphate slurry composition provided herein comprises tetrasodium pyrophosphate in a concentration of about 0.10 to about 1.50 weight % based on the total weight of the slurry. In one embodiment, the dispersant in the aluminum phosphate slurry composition provided herein comprises tetrasodium pyrophosphate in a concentration of about 0.25 to about 1.00 weight % based on the total weight of the slurry. In another embodiment, the dispersant in the aluminum phosphate slurry composition provided herein comprises tetrasodium pyrophosphate in a concentration of about 0.25, 0.27, 0.30, 0.35, 0.45, 0.50, 0.75, 0.97 or 1.00 weight % based on the total weight of the slurry.

In one embodiment, the aluminum phosphate slurry composition provided herein comprises from about 50 weight % to about 60 weight % aluminum phosphate and less than about 2 or less than about 1 weight % tetrasodium pyrophosphate (TSPP) based on the total weight of the slurry. In one embodiment, the aluminum phosphate slur composition provided herein comprises from about 50 weight % to about 60 weight % aluminum phosphate and about 0.2 weight % to about 1.00 weight % tetrasodium pyrophosphate based on the total weight of the slurry. In another embodiment, the aluminum phosphate slurry composition provided herein comprises about 51, 53 or 58 weight % aluminum phosphate and about 0.25, 0.27, 0.50, 0.97 or 1.00 weight % tetrasodium pyrophosphate based on the total weight of the slurry. In yet another embodiment, the aluminum phosphate slurry composition provided herein comprises about 51 weight % aluminum phosphate and about 0.25, 0.50 or 1.00 weight % tetrasodium pyrophosphate based on the total weight of the slurry.

In one embodiment, the dispersant in the aluminum phosphate slurry composition provided herein comprises pentasodium triphosphate in a concentration of about 0.10 to about 3.00 weight % based on the total weight of the slurry. In another embodiment, the dispersant in the aluminum phosphate slurry composition provided herein comprises pentasodium triphosphate in a concentration of about 0.10 to about 1.60 weight % based on the total weight of the slurry. In yet another embodiment, the dispersant in the aluminum phosphate slurry composition provided herein comprises pentasodium triphosphate in a concentration of about 0.25 to about 1.00 weight % based on the total weight of the slurry. In a further embodiment, the dispersant in the aluminum phosphate slurry composition provided herein comprises pentasodium triphosphate in a concentration of about 0.25, 0.30, 0.50, 0.53, 0.75, 0.99, 1.00 or 1.50 weight % based on the total weight of the slurry.

In one embodiment, the aluminum phosphate slurry composition provided herein comprises from about 50 weight % to about 60 weight % aluminum phosphate and less than about 2, less than about 1.5 or less than about 1 weight % pentasodium triphosphate based on the total weight of the slurry. In one embodiment, the aluminum phosphate slurry composition provided herein comprises from about 50 weight % to about 60 weight % aluminum phosphate and about 0.10 weight % to about 1.50 weight % pentasodium triphosphate based on the total weight of the slurry. In another embodiment, the aluminum phosphate slurry composition provided herein comprises about 51, 53 or 58 weight % aluminum phosphate and about 0.50 weight % pentasodium triphosphate based on the total weight of the slurry. In yet another embodiment, the aluminum phosphate slurry composition provided herein comprises about 51 weight % aluminum phosphate and about 0.50 weight % pentasodium triphosphate based on the total weight of the slurry.

In one embodiment, the dispersant in the aluminum phosphate slurry composition provided herein comprises tetrapotassium pyrophosphate (TKPP) in a concentration of about 0.10 to about 2.00 weight % based on the total weight of the slurry. In another embodiment, the dispersant in the aluminum phosphate slurry composition provided herein comprises tetrapotassium pyrophosphate in a concentration of about 0.0 to about 1.75 weight % based on the total weight of the slurry. In yet another embodiment, the dispersant in the aluminum phosphate slurry composition provided herein comprises tetrapotassium pyrophosphate in a concentration of about 0.25 to about 1.55 weight % based on the total weight of the slurry. In a further embodiment, the dispersant in the aluminum phosphate slurry composition provided herein comprises tetrapotassium pyrophosphate in a concentration of about 0.25, 0.30, 0.50, 0.51, 0.75, 0.99, 1.00, 1.50 or 1.54 weight % based on the total weight of the slurry.

In one embodiment, the aluminum phosphate slurry composition provided herein comprises from about 50 weight % to about 60 weight % aluminum phosphate and less than about 2 or less than about 1 weight % tetrapotassium pyrophosphate based on the total weight of the slurry. In one embodiment, the aluminum phosphate slurry composition provided herein comprises from about 50 weight % to about 60 weight % aluminum phosphate and about 0.50 weight % to about 1 weight % tetrapotassium pyrophosphate based on the total weight of the slurry. In another embodiment, the aluminum phosphate slurry composition provided herein comprises about 51, 53 or 58 weight % aluminum phosphate and about 1 weight % tetrapotassium pyrophosphate based on the total weight of the slurry. In a further embodiment, the aluminum phosphate slurry composition provided herein comprises about 51 weight % aluminum phosphate and about 1 weight % tetrapotassium pyrophosphate based on the total weight of the slurry.

In one embodiment, the dispersant in the aluminum phosphate slurry composition provided herein comprises sodium potassium triphosphate in a concentration of about 0.10 to about 3.50 weight % based on the total weight of the slurry. In another embodiment, the dispersant in the aluminum phosphate slurry composition provided herein comprises sodium potassium triphosphate in a concentration of about 0.10 to about 3.10 weight % based on the total weight of the slurry. In yet another embodiment, the dispersant in the aluminum phosphate slurry composition provided herein comprises sodium potassium triphosphate in a concentration of about 0.25 to about 1.55 weight % based on the total weight of the slurry. In a further embodiment, the dispersant in the aluminum phosphate slurry composition provided herein comprises sodium potassium triphosphate in a concentration of about 0.10, 0.24, 0.25, 0.30, 0.50, 0.52, 0.75, 0.99, 1.00 or 1.50 weight % based on the total weight of the slurry.

In one embodiment, the aluminum phosphate slurry composition provided herein comprises from about 50 weight % to about 60 weight % aluminum phosphate and less than about 2 or less than about 1 weight % sodium potassium triphosphate based on the total weight of the slurry. In one embodiment, the aluminum phosphate slurry composition provided herein comprises from about 50 weight % to about 60 weight % aluminum phosphate and about 1 weight % sodium potassium triphosphate based on the total weight of the slurry. In another embodiment, the aluminum phosphate slurry composition provided herein comprises about 51, 53 or 58 weight % aluminum phosphate and about 1 weight % sodium potassium triphosphate based on the total weight of the slurry. In a further embodiment, the aluminum phosphate slurry composition provided herein comprises about 51 weight % aluminum phosphate and about 1 weight % sodium potassium triphosphate based on the total weight of the slurry.

In one embodiment, the dispersant in the aluminum phosphate slurry composition provided herein comprises sodium hexametaphosphate in a concentration of about 0.10 to about 3.50 weight % based on the total weight of the slurry. In another embodiment, the dispersant in the aluminum phosphate slurry composition provided herein comprises sodium hexametaphosphate in a concentration of about 0.10 to about 0.10 weight % based on the total weight of the slurry. In one embodiment, the dispersant in the aluminum phosphate slurry composition provided herein comprises sodium hexametaphosphate in a concentration of about 0.25 to about 1.55 weight % based on the total weight of the slurry. In another embodiment, the dispersant in the aluminum phosphate slurry composition provided herein comprises sodium hexametaphosphate in a concentration of about 0.10, 0.25, 0.29, 0.50, 0.75, 0.99, 1.00 or 1.50 weight % based on the total weight of the slurry.

In one embodiment, the aluminum phosphate slurry composition provided herein comprises from about 50 weight % to about 60 weight % aluminum phosphate and less than about 2 or less than about 1 weight % sodium hexametaphosphate based on the total weight of the slurry. In one embodiment, the aluminum phosphate slurry composition provided herein comprises from about 50 weight % to about 60 weight % aluminum phosphate and about 0.25 weight % to about 1 weight % sodium hexametaphosphate based on the total weight of the slurry. In another embodiment, the aluminum phosphate slurry composition provided herein comprises about 51, 53 or 58 weight % aluminum phosphate and about 0.25 or about 1 weight % sodium hexametaphosphate based on the total weight of the slurry. In another embodiment, the aluminum phosphate slurry composition provided herein comprises about 51 weight % aluminum phosphate and about 0.25 or about 1 weight % sodium hexametaphosphate based on the total weight of the slurry.

Further exemplary dispersants are listed in Tables 1a-1e.

TABLE 1a

PHOSPHATE DISPERSANTS

| Group Name | General Formula | Examples |
|---|---|---|
| Monophosphate or orthophosphate | $PO_4^{3-} \cdot aH_2O$<br>$a = 0$ to $12$ | $Na_3PO_4$, trisodium phosphate<br>$Ca(H_2PO_4)_2$, calcium dihydrogen phosphate |
| Polyphosphates (chain form) | $P_nO_{3n+1}^{(n+2)-}$ | $NaH_3P_2O_7$, Sodium trihydrogen pyrophosphate(monosodium pyrophosphate)<br>$Na_2H_2P_2O_7$, Disodium dihydrogen pyrophosphate (sodium acid pyrophosphate)<br>$Na_3HP_2O_7$, Trisodium hydrogen pyrophosphate (trisodium pyrophosphate)<br>$Na_4P_2O_7$, Tetrasodium pyrophosphate (TSPP)<br>$KH_3P_2O_7$, Potassium trihydrogen pyrophosphate<br>$K_2H_2P_2O_7$, Dipotassium dihydrogen pyrophosphate (potassium acid pyrophosphate)<br>$K_3HP_2O_7$, Tripotassium hydrogen pyrophosphate<br>$K_4P_2O_7$, Tetrapotassium pyrophosphate<br>$CaH_2P_2O_7$, Calcium dihydrogen pyrophosphate<br>$Na_5P_3O_{10}$, Sodium tripolyphosphate (STP)<br>$Na_xK_yP_3O_{10}$, ($x = 1$-$4$, $y = 5$-$x$) Sodium potassium tripolyphosphate<br>$K_5P_3O_{10}$, Potassium tripolyphosphates (KTP)<br>$Ca_5P_3O_{10}$, Calcium triphosphate<br>$(LiPO_3)_n$ Lithium polyphosphate<br>$(NaPO_3)_x$, Sodium polyphosphate<br>$[Na_2H(PO_3)_3]_n$ Disodium hydrogen polyphosphates<br>$(KPO_3)_n$, Potassium polyphosphates<br>$(NH_4PO)_n$ or $(NH_4)_{n+2}P_nO_{3n+1}$ Ammonium polyphosphate<br>$[Ca(PO_3)_2]_n$, Calcium polyphosphate<br>$[CuK_2(PO_3)_2]_n$, Copper potassium polyphosphate<br>$[CuNH_4(PO_3)_2]_n$, Copper ammonium polyphosphate<br>$[Al(PO_3)_3]_n$ Aluminum polyphosphate<br>$(RbPO_3)_n$ Rubidium polyphosphate<br>$(CsPO_3)_n$ Cesium polyphosphate |
| Cross linked or ultraphosphates | $P_nO_{3n-1}^{(n-2)-}$ | $CaP_4O_{10}$<br>$Ca_2P_6O_{17}$ |
| Metaphosphates | $(PO_3^-)_n$ | $Na_3(PO_3)_3$, sodium trimetaphosphate<br>$Na_6(PO_3)_6$, sodium hexametaphosphate |

Where $n = 2, 3, 4 \ldots$

TABLE 1b

ORGANIC PHOSPHATES

| Group Name | General Formula | Examples |
|---|---|---|
| Glycerol Phosphates | $C_3H_7O_6P^{2-}$ $M^+$<br>$M^+$ = metal cation | Glycerol 1-phosphates<br>Glycerol 2-phosphate |
| Phosphate esters | | Phosphate Ester of TriStyryPhenol POE 16, free acid |
| | | Phosphate Ester of TriStyryPhenol POE 16, K Salt |
| | | Phosphate Ester of C8-10, Acid |
| | | Phosphate Ester of 2-Ethyl Hexanol, Acid |
| | | Phosphate Ester of 2-Ethyl Hexanol POE 2, K Salt |
| | | Phosphate Ester of NonylPhenol POE 4, Acid |
| | 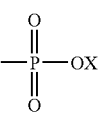 | Phosphate Ester of NonylPhenol POE 6, Acid<br>Phosphate Ester of NonylPhenol POE 6, K Salt<br>Phosphate Ester of NonylPhenol POE 9, Acid |
| | O<br>‖<br>RO—P—OR<br>│<br>OX | Phosphate Ester of NonylPhenol POE 10, Acid<br>Phosphate Ester of DiNonylPhenol POE 8, Acid<br>Phosphate Ester of IsoDecyl Alcohol POE 6, Acid |
| | O<br>‖<br>RO—P—OX<br>│<br>OX | Phosphate Ester of IsoDecyl Alcohol POE 6, K Salt<br>Phosphate Ester of TriDecyl Alcohol POE 6, Acid<br>Phosphate Ester of C12, K Salt |
| | R = Alkyl chain, unsubstituted or substituted with one or more groups selected from OH, halo and amino. X = metal cation or H | Phosphate Ester of C12-15, Acid<br>Phosphate Ester of C12-15 POE 5, Acid<br>Phosphate Ester of C12-15 POE 5, K Salt<br>Phosphate Ester of C12-18 POE 3, Acid<br>Phosphate Ester of C12-14 POE 6, Acid<br>Phosphate Ester of C12-18 POE 9, Na Salt<br>Phosphate Ester of C16-18 POE 5, Acid<br>Phosphate Ester [Alcohol Carbon Chain]-[Moles of EO][Salt] |

TABLE 1c

SILICATE DISPERSANTS

| Silicate type | Unit structures | Examples |
| --- | --- | --- |
| Orthosilicate | $SiO_4^{4-}$ | $Na_4SiO_4$ |
| Metasilicate | $SiO_3^{2-}$ | $Na_2SiO_3$ |
| Disilicate | $Si_2O_5^{2-}$ | $Na_2Si_2O_5$ |
| Tetrasilicate | $Si_4O_9^{2-}$ | $Na_2Si_4O_9$ |

TABLE 1d

BORATE DISPERSANTS

| Group Name | Formula | Examples |
| --- | --- | --- |
| Borates | $M_2O \cdot nB_2O_3 \cdot aH_2O$<br>M = metal cation,<br>n = 1-5 and a = 0-10 | $Na_2O \cdot 2B_2O_3 \cdot 10H_2O$, disodium tetraborate decahydrate<br>$Na_2O \cdot 4B_2O_3 \cdot 4H_2O$, disodium octaborate tetrahydrate<br>$Na_2O \cdot 5B_2O_3 \cdot 10H_2O$, sodium pentaborate pentahydrate<br>$Li_2O \cdot 2B_2O_3 \cdot 4H_2O$<br>$Li_2O \cdot B_2O_3 \cdot 4H_2O$<br>$Na_2O \cdot 5B_2O_3 \cdot 10H_2O$<br>$Na_2O \cdot 2B_2O_3 \cdot 10H_2O$<br>$Na_2O \cdot B_2O_3 \cdot 4H_2O$<br>$K_2O \cdot 5B_2O_3 \cdot 8H_2O$<br>$K_2O \cdot 2B_2O_3 \cdot 4H_2O$<br>$K_2O \cdot B_2O_3 \cdot 2.5H_2O$<br>$Rb_2O \cdot 5B_2O_3 \cdot 8H_2O$<br>$Cs_2O \cdot 5B_2O_3 \cdot 8H_2O$<br>$Cs_2O \cdot B_2O_3 \cdot 7H_2O$<br>$(NH_4)_2O \cdot 2B_2O_3 \cdot 4H_2O$<br>$(NH_4)_2O \cdot 5B_2O_3 \cdot 8H_2O$ |

TABLE 1e

ALUMINATE DISPERSANTS

| Group Name | Examples |
| --- | --- |
| Aluminates | $NaAlO_2$, $Na_2O \cdot Al_2O_3$ or $Na_2Al_2O_4$<br>$BaO \cdot 6Al_2O_3$<br>$BaO \cdot Al_2O_3$<br>$3BaO \cdot Al_2O_3$ |

Processes for Preparing Amorphous Aluminum Phosphate Particles

The amorphous aluminum phosphate particles used in the slur can be prepared by any methods known to one of skill in the art. Exemplary methods are described herein and in U.S. patent publication nos. 2006/0211798 and 2006/0045831 and U.S. application Ser. No. 11/891,510. The disclosures of such patent applications is incorporated by reference in their entirety herein.

In one embodiment, the process of manufacturing hollow particles of aluminum phosphate, aluminum polyphosphate, aluminum metaphosphate, aluminum orthophosphate (or combinations thereof) used in the slurry formulations comprises the following general steps. One of skill in the art will recognize that certain steps may be altered or omitted altogether. The steps include: preparation of the main reagents used in the process, such as diluted solution of phosphoric acid, diluted solution of aluminum sulfate, and diluted solution of sodium hydroxide sodium carbonate, potassium hydroxide or ammonium hydroxide; simultaneous ad controlled addition of the reagents in a reactor equipped with a sloshing system to keep the homogeneity of the mixture during the process; control, during, the addition of the reagents in the reactor, of the temperature and pH (acidity) of the mixture and, mainly, the reaction time; filtration of the suspension, with approximately 8.0% of solids and separation of the liquid ad solid phases, in an appropriate equipment; washing out of the impurities present in the filter cake with slightly alkaline aqueous solution; dispersion of the washed cake, containing approximately 20-30% of the solids, in an adequate disperser; drying of the dispersed pulp in a turbo-dryer; micronization of the dried product to an average granulometry of 5.0 to 10 microns; and polymerization of the dried product by thermal treatment of the aluminum phosphate in a calcinator.

There are several ways to prepare the main reagents in this process. One source of phosphorus for the manufacturing of aluminum phosphate is the fertilizer grade phosphoric acid, from any origin, as it is clarified and discolored. For example, a commercial phosphoric acid containing approximately 54% of $P_2O_5$ may be chemically treated and/or diluted with treated water resulting in a concentration of 20% $P_2O_5$. Also, as an alternative to this process (instead of fertilizer grade phosphoric acid or purified phosphoric acid), salts of phosphorus as orthophosphates, polyphosphates or metaphosphates can be used.

Another reagent for the process is the commercial aluminum sulfate. The aluminum sulfate may be obtained from the reaction between the alumina (hydrate aluminum oxide) with concentrated sulfuric acid (98% $H_2SO_4$), and then clarified and stored at a 28% concentration of $Al_2O_3$. For the reaction to have favorable kinetics, the aluminum sulfate is diluted with water treated at 5.0% of $Al_2O_3$. As an alternative for this process, the source of aluminum can be any other salt of aluminum, as well as aluminum hydroxide or aluminum in metallic form.

The neutralization of the reaction is carried out with a sodium hydroxide solution, which may be commercially purchased in different concentrations. A concentration of 50% of NaOH may be purchased and diluted. For example, in the first phase of the reaction, when the initial reagents are being mixed, the sodium hydroxide may be used in the concentration of 20% of NaOH. In the second phase of the reaction, due to the need of a fine-tuning of the product acidity, a sodium hydroxide solution with 5.0% of NaOH may be used. As an alternative neutralizer, ammonium hydroxide or sodium carbonate (soda ash) may be used.

In one aspect, a chemical reaction results in the formation of hydroxoaluminum orthophosphates, either pure or mixed (e.g., $Al(OH)_2(H_2PO_4)$ or $Al(OH)(HPO_4)$). The reaction, as described, is carried out through the mixture of the three reagents, i.e., phosphoric acid solution, aluminum sulfate solution, and sodium hydroxide solution. The reagents are dosed in a reactor, typically containing a sloshing system, during a 30-minute period. During the addition of the reagents in the reactor, the pH of the mixture is control led within a 1.4 to 4.5 range and a reaction temperature, between 35° C. and 40° C. The reaction is completed after 15 minutes of the reagent mixture. In this period, the pH of the mixture may be adjusted at 3.0 to 5.0, with the addition of more diluted sodium hydroxide. In this embodiment, the temperature is preferably below approximately 40° C. At the end of the reaction, the suspension formed should contain a mole ratio between the phosphorus:aluminum elements in a 1.1 to 1.5 range.

After the formation of the aluminum orthophosphate, the suspension containing around 6.0% to 10.0% of solids, with a maximum approximate temperature of 45° C., and density in a 1.15 to 1.25 g/cm3 range, is pumped to a conventional filter press. In the filter press, the liquid phase (sometimes referred to as the "liquor") is separated from the solid phase (often referred to as the "cake"). The wet cake, containing approximately 18% to 45% of solids, and still possibly contaminated with the sodium sulfate solution, is kept in the filter for washing cycle. The filtered concentrate, which is basically a concentrated solution of sodium sulfate, is extracted from the filter and stored for future usage.

In one embodiment, the washing of the wet cake is performed in the filter itself and in three process steps. In the first washing ("displacement washing") the largest part of the filtered substance that is contaminating the cake is removed. The washing step is performed using treated water over the cake at a flow rate of 6.0 m$^3$ of water/ton of dried cake. A second washing step, also with treated water and with a flow of 8.0 m$^3$ of water/ton of dried cake, may be carried out to further reduce, if not eliminate, the contaminants. And, finally, a third washing step using a slightly alkaline solution may be carried out. Such third washing step may be performed for the neutralization of the cake and to keep its pH in the 7.0 range. Finally, the cake may be blown with compressed air during a certain period of time. In certain embodiments, the wet product comprises between 35% and 45% of solids.

In one aspect, the cake dispersion may be processed in such a way that the filter cake, wet and washed, and containing approximately 35% of solids, is extracted from the press filter by a conveyor belt and transferred to a reactor/disperser. The dispersion of the cake is aided by the addition of a dilute solution of tetra-sodium pyrophosphate.

After the dispersion step, the product is then dried, when the aluminum phosphate "mud," with a percentage of solids within the 18% to 50% range, is pumped to the drying unit. In one embodiment, the water removal from the material can be carried out with drying equipment, such as a "turbo dryer" type through an injection of a hot air stream, at a temperature of 135° C. to 140° C., through the sample. The final humidity of the product should preferentially be kept in the 10% to 20% of water range.

In the next step, the orthophosphate of the dry aluminum, as $Al(H_2PO_4)_3$, is condensed by a thermal treatment to form a hollow aluminum polyphosphate, that is $(Al_{(n+2)/3}(P_nO_{(3n+1)})$, where "n" can be any integer greater than 15 preferably, n is greater than or equal to 4. In certain embodiments, n is greater than or equal to 10. In other embodiments, n is greater than or equal to 20, less than 100 or less than 50. This process step can be carried out by heating the phosphate aluminum, in a spray-drier, in a temperature range of 500° C. to 600° C. After the polymerization, the product may be cooled quickly and sent to the micronization unit. At this point, product micronization step may be carried out. Finally, the resulting product that leaves the drier is transferred to the grinding and finishing unit, ground in a micronizer/sorter, and its granulometry kept in the 99.5% range below 400 mesh.

In another aspect, the steps in the process for preparation of aluminum phosphate used in the slurry compositions include, preparation of the main reagents used in the process, such as solution of phosphoric acid, solid hydrated aluminum hydroxide and sodium aluminate solution; addition of the reagents in a reactor equipped with a sloshing system to keep the homogeneity of the mixture during the process; control, during the addition of the reagents in the reactor, of the temperature and pH of the mixture and the reaction time; filtration of the suspension; washing out of the impurities present in the filter cake; dispersion of the washed cake in an adequate disperser; drying of the dispersed pulp in a turbo-dryer or spray drier; micronization of the dried product to an average granulometry of 1.0 to 10 microns; and polymerization of the dried product by thermal treatment of the aluminum phosphate in a calcinator. In certain embodiments, the process comprises a step of premixing phosphoric acid and aluminum sulfate solutions before addition to the reactor. In certain embodiments, the aluminum phosphate or polyphosphate in pigments can be prepared and used as a slurry pulp (dispersion of high content of solids, which flows under the action of gravity or low pressure pumps) with 20-60% or more of non-volatiles by weight; as dried and micronized aluminum phosphate with about 10-30%, in certain embodiments, 10, 12, 15, 17, 20, 25 or 30% of humidity; and also in the polymeric form as calcinated and micronized aluminum polyphosphate.

In one embodiment, the amorphous aluminum phosphate is prepared by a reaction between phosphoric acid and aluminum hydroxide. The process may further comprise a step of neutralizing. The neutralizing step can be carried out by sodium aluminate.

In certain embodiments, the process for making an amorphous aluminum phosphate or polyphosphate comprises reacting phosphoric acid, aluminum hydroxide and sodium aluminate.

In one embodiment, the process for making an amorphous sodium phosphate or polyphosphate comprises reacting aluminum phosphate and sodium aluminate.

In one embodiment the reaction comprises two steps. In the first step, phosphoric acid reacts with aluminum hydroxide to produce aluminum phosphate at an acidic pH. In one embodiment, the aluminum phosphate is produced as a water soluble aluminum phosphate. In certain embodiments, the pH of water soluble aluminum phosphate is less than about 3.5. In certain embodiments, the pH is about 3, 2.5, 2, 1.5 or 1. In certain embodiments, the aluminum phosphate is produced as a fine solid-liquid dispersion at a higher pH. In one embodiment, the pH is about 3, 4, 5 or 6.

In a second step, the acidic aqueous aluminum phosphate solution or dispersion from the first chemical step is reacted with a sodium aluminate. In certain embodiments, the sodium aluminate is used as an aqueous solution at a pH greater than about 10. In one embodiment, the pH of the aqueous sodium aluminate solution is about 11, 12 or 13. In one embodiment, the pH of the aqueous sodium aluminate solution is greater than about 12. The aluminum sodium phosphate is generated as a solid precipitate. In one embodiment, the solid aluminum-sodium phosphate has a molar ratio P/Al=0.85 and a molar ratio Na/Al=0.50. In one embodiment, the solid aluminum-sodium phosphate has a molar ratio P/Al=1.0 and a molar ratio Na/Al=0.76. In certain embodiments, the molecules with other formulation ratios can be obtained by the same procedure.

In one embodiment, the solid hydrated aluminum hydroxide is added to the phosphoric acid in the first chemical step. In another embodiment, the solid hydrated aluminum hydroxide is added to the purified liquid sodium aluminate solution to form a colloidal solution. In another embodiment, the solid hydrated aluminum hydroxide is added directly as solid or solid-liquid suspension in water in the second reaction step. In certain embodiments, the reaction is carried out in a single step.

In certain embodiments, the reactor to perform the second step of the reaction, i.e., reaction of an acidic aqueous aluminum phosphate solution or dispersion from the first chemical step with sodium aluminate, has a very high mixing and shear stress performance to mix the reactants and to generate a solid precipitate with the desired particle size distribution. In certain embodiments, the reactor dispersion properties could be adjusted for the spray drying process requirements. In one embodiment, the reactor is a CSTR (continuous stirred-tank reactor).

The sodium aluminate solution for use in the process provided herein can be obtained by methods known to those of skill in the art. In one embodiment, the sodium aluminate solution is a standard chemical product resulting from the first step in the Bayer process in the alumina ($Al_2O_3$) extraction from Bauxite ore, often called "purified sodium pregnant solution". This liquid aqueous sodium aluminate solution is saturated at ambient temperature and stabilized with sodium hydroxide, NaOH. The typical compositions are: sodium aluminate, 58 to 65% mass (25 to 28% mass of $Al_2O_3$) and sodium hydroxide, 3.5 to 5.5% mass (2.5 to 4% mass of free $Na_2O$). In certain embodiments, it has a molar ratio Na/Al from about 1.10 to 2.20 and low impurities (depending on the Bauxite origin: Fe=40 ppm, Heavy metals=20 ppm, and small amount of anions, $Cl^-$ and $SO_4^{2-}$). In certain embodiments, the sodium aluminate water solution has a molar ratio Na/Al of about 1.10, 1.15, 1.20, 1.25, 1.30, 1.35, 1.40, 1.45, 1.50, 1.55, 1.60, 1.65, 1.70, 1.75, 1.80, 1.85, 1.90, 1.95, 2.0, 2.05, 2.10, 2.15 or 2.2. The solution color, in certain embodiments, is amber. In certain embodiments, the viscosity of the solution is approximately 100 cP. In certain aspects, the sodium aluminate solution is purified by polishing filtration. In certain embodiments, the sodium aluminate solution is regenerated from solid aluminum hydroxide and sodium hydroxide.

The solid hydrated aluminum hydroxide is obtained by methods known to one of skill in the art. In one embodiment, aluminum hydroxide is an industrial chemical produced by the Bayer process. The solid hydrated aluminum hydroxide can be obtained from the "purified sodium aluminate pregnant solution" by precipitation which is accomplished via cooling the solution. In one embodiment, the sodium aluminate thus produced has a low level of impurities and a variable amount of humidity (cations about 70 ppm, Chlorates about 0.85% mass and Sulfates about 0.60% mass (these impurities are determined by the purification level of the "Purified Sodium Aluminate pregnant solution) and the total water hydration and humidity about 22.0 to 23.5% mass. In one aspect, both raw materials are standard primary industrial products, just first and second step from the Bauxite processing, (commodities) produced in huge amounts by the Bauxite processors.

In one embodiment, the chemical reaction results in the formation of aluminum sodium phosphate ($Al(OH)_{0.7}Na_{0.7}(PO_4) \cdot 1.7H_2O$). After the formation of aluminum sodium phosphate, the suspension containing around 6.0% to 10.0% of solids, with a maximum approximate temperature of 45° C., and density in a 1.15 to 1.25 g/cm³ range, is pumped to a conventional filter press. In one embodiment, the suspension contains about 5-30%, 10-30% or 15-25% solids. In one embodiment, the suspension contains about 15-25% solids. In one embodiment, the suspension density is in a 1 to 1.3 or 1.10 to 1.20 g/cm³ range. In the filter press, the liquid phase (sometimes referred to as the "liquor") is separated from the solid phase (sometimes referred to as the "cake"). The wet cake, containing approximately 35% to 45% of solids, in certain embodiment, about 35, 40 or 45% solids, is kept in the filter for washing cycle.

In one embodiment, the washing of the wet cake is performed in the filter itself and in two to three process steps. In the first washing ("displacement washing") the largest part of the filtered substance that is contaminating the cake is removed. The washing step is performed using treated water over the cake at a flow rate of 6.0 m³ of water/ton of dried cake. A second washing step, also with treated water and with a flow of 8.0 m³ of water/ton of dried cake, may be carried out to reduce the contaminants. And, finally, a third washing step may be carried out with water to further reduce the contaminants. Finally, the cake may be blown with compressed air during a certain period of time. The wet product should present between 35% and 45% of solids.

Next, in this particular embodiment, the cake dispersion may be processed in such a way that the filter cake, wet and washed, is extracted from the press filter by a conveyor belt and transferred to a reactor/disperser.

In certain embodiments, the dispersion of the cake is aided by the addition of a dispersing agent, such as a solution of sodium polyphosphate.

In one embodiment, after the dispersion step, the product is dried, when the aluminum phosphate "slurry," with a percentage of solids within the 30% to 50% rage, is pumped to the drying unit. In another embodiment, the water removal from the material can be carried out with drying equipment, such as a "turbo dryer" through an injection of a hot air stream, or a "spray dryer" at a temperature of 80° C. to 350° C., through the sample. The final humidity of the product can be kept in the 10% to 20% of water range.

In certain embodiments, the next step of the process includes product calcination. In this step, the orthophosphate ions of the dry aluminum phosphate undergo condensation to polyphosphate ions (diphosphate, triphosphate, tetraphosphate, n-phosphate where "n" can be any integer greater than 1, in certain embodiments, n is greater than or equal to 4). In one embodiment, n is greater than or equal to 10. In another embodiment, n is greater than or equal to 20. In one embodiment, n is less than 100. In another embodiment, n is less than 50. This process step is carried out by heating the aluminum phosphate, in a calcinator, in a temperature range of 500° C. to 600° C. After the polymerization, the product may be cooled quickly and sent to the micronization unit. At this point, product micronization step may be carried out.

Finally, the resulting product that leaves the calcinator is transferred to the grinding and finishing unit, ground in a micronizer/sorter, and its granulometry kept in the 99.5% range below 400 mesh.

In certain embodiments, micronization of the dried product is carried out to an average granulometry of 5.0 to 10 microns or between about 0.1 to about 5 microns.

Processes for Preparation of Aluminum Phosphate Slurry Compositions

The aluminum phosphate slurry compositions comprising amorphous aluminum phosphate and one or more dispersants can be prepared any methods known to one of skill in the art. In one embodiment, the slurry composition comprises about 40 to about 70 weight % aluminum phosphate by the total weight of the composition and is prepared by mixing i) a stock slurry comprising about 30 weight % aluminum phosphate: ii) aluminum phosphate powder, for example, obtained by the process described above; and iii) a dispersant.

In one embodiment, the stock slurry comprises about 30-40 weight % amorphous aluminum phosphate. The stock slurry can be prepared, for example, as described in the processes above.

In certain embodiments, the slurry compositions comprising aluminum phosphate and one or more dispersants is prepared by mixing i) an amorphous aluminum phosphate powder, ii) a dispersant or a mixture of dispersants and iii) a solvent. In certain embodiments, the solvent is water. The amorphous aluminum phosphate powder can be prepared, for example, by the processes described above. The slurry mixture is stirred for 10-25 minutes using a suitable disperser, for example, Cowles disperser, with a suitable stirring velocity, for example stirring velocity of 730±130 rpm to obtain a homogeneous dispersion. Exemplary slurry compositions are described in Example 3.

Applications of Aluminum Phosphate Slurry Compositions

The aluminum phosphate particles in the slurry compositions described herein demonstrate improved properties in certain aspects. For example, the aluminum phosphate particles present voids, when the particles are dried, for example, at room temperature, or up to 130° C. In one embodiment, the particles present voids when dried between 40° C. and 130° C. In another embodiment, the particles present voids when dried between 60° C. and 130° C. In certain embodiments, the particles present voids when dried between 80° C. and 120° C. In addition, the aluminum phosphate particles have a core-and-shell structure. In other words, these particles have shells chemically different from their cores. This property is evidenced by several different observations. First, the energy-filtered inelastic electron images of the particles in the plasmon region (10-40 eV), as measured by a transmission electron microscope, show bright lines surrounding most particles. Nanoindentation measurements performed in the digital pulsed force microscope (DPFM) show that particle surfaces are stiffer than the particle interior.

When a dispersion of such particles dries under air at room temperature or up to 120° C., nano-sized particles are formed that have a core-and-shell structure. The nano-sized particles show a partial coalescence into micron-sized aggregates with irregular shapes. Such particles may be observed by analytical electron microscopy. Moreover, these particles contain many voids dispersed as closed pores in their interior. The cores of the particles are more plastic than the respective shells of the particles. This phenomenon is evidenced by growth of the voids upon heating, while the perimeter of the shells remains essentially unaltered.

The aluminum phosphate compositions described herein can be used as replacement for titanium dioxide (i.e., $TiO_2$). Titanium dioxide is the current standard white pigment used by almost all manufacturers involved in latex paint formulations. The optical measurements taken from films drawn using a paint containing a usual load of titanium dioxide and a paint wherein fifty percent of the titanium dioxide load was replaced by amorphous aluminum phosphate demonstrate that aluminum phosphate may replace titanium dioxide producing films while preserving the optical properties of the film.

The aluminum phosphate used in the compositions described herein has relatively small particle size. Such smaller particle sizes allow the particles to distribute extensively in the film and to associate intimately with the resin, with inorganic fillers and with themselves, thereby creating clusters that are sites for extensive void formation when the paint dries. In some embodiments, the particles of aluminum phosphate or polyphosphate are substantially free of open pores while containing a number of closed pores. As a result, in such embodiments, the macropore volume is substantially less than 0.1 cc/gram.

Opacification of water-based paint films using aluminum phosphate in some embodiments involves unique features. The wet coating film is a viscous dispersion of polymer, aluminum phosphate, titanium dioxide and filler particles. When this dispersion is cast as a film and dried, it behaves differently from a standard paint (below the critical pigment volume concentration, CPVC). In a standard paint, the low glass transition temperature (Tg) resin is plastic at room temperature and coalesced, so that the resin film fills pores and voids. A paint formulated with aluminum phosphate, however, can exhibit a different behavior. The closed pores form, as described herein, and contribute to the film hiding power.

Various paints can be formulated using the aluminum phosphate compositions described in various embodiments herein, alone or in combination with another pigment, such as titanium dioxide. A paint comprises one or more pigments and one or more polymers as the binder (sometimes referred to as "binding polymer"), and optionally various additives. There are water-borne paints and non-water-borne paints. Generally, a water-borne paint composition is composed of four basic components: binder, aqueous carrier, pigment(s) and additive(s). The binder is a nonvolatile resinous material that is dispersed in the aqueous carrier to form a latex. When the aqueous carrier evaporates, the binder forms a paint film that binds together the pigment particles and other non-volatile components of the water-borne paint composition. Water-borne paint compositions can be formulated according to the methods and components disclosed in U.S. Pat. No. 6,646,058, with or without modifications. The disclosure of such patent is incorporated by reference in its entirety herein. The aluminum phosphate compositions described in various embodiments herein can be used to formulate water-borne paints, alone or in combination with titanium dioxide.

A common paint is a latex paint which comprises a binding polymer, a hiding pigment, and optionally a thickener and other additives. Again, the aluminum phosphate compositions described in various embodiments herein can be used to formulate latex paints as a pigment, alone or in combination with titanium dioxide. Other components for making a latex paint are disclosed in U.S. Pat. No. 6,881,782 and No. 4,782,109, which are incorporated by reference herein in their entirety. By way of illustration, suitable components and methods for making latex paints are briefly explained below.

In some embodiments, suitable binding polymers include emulsion copolymerized ethylenically unsaturated monomers including 0.8% to 6% of fatty acid acrylate or methacrylate such as lauryl methacrylate and/or stearyl methacrylate. Based on the weight of copolymerized ethylenic monomers, the polymeric binder comprises 0.8% to 6% fatty acid methacrylate or acrylate where preferred compositions contain 1% to 5% of copolymerized fatty acid acrylate or methacrylate having an aliphatic fatty acid chain comprising between 10 and 22 carbon atoms. In one embodiment, copolymer compositions are based on copolymerized fatty acid methacrylate. In another embodiment, lauryl methacrylate and/or stearyl methacrylate are used. In one embodiment, lauryl methacrylate is the monomer of choice. Other useful fatty acid methacrylates include myristyl methacrylate, decyl methacrylate, palmitic methacrylate, oleic methacrylate, hexadecyl methacrylate, cetyl methacrylate and eicosyl methacrylate, and similar straight chain aliphatic methacrylate. Fatty acid methacrylates or acrylates typically comprise commercial fatty oils coreacted with methacrylic acid or acrylic acid to provide primarily the dominant fatty acid moiety methacrylate with minor amounts of other fatty acid acrylates or methacrylates.

Polymerizable ethylenically unsaturated monomers contain carbon-to-carbon unsaturation and include vinyl monomers, acrylic monomers, allylic monomers, acrylamide monomers, and mono- and dicarboxylic unsaturated acids. Vinyl esters include vinyl acetate, vinyl propionate, vinyl butyrates, vinyl benzoates, vinyl isopropyl acetates and similar vinyl esters; vinyl halides include vinyl chloride, vinyl fluoride, and vinylidene chloride; vinyl aromatic hydrocarbons include styrene, methyl styrenes and similar lower alkyl styrenes, chlorostyrene, vinyl toluene, vinyl naphthalene, and divinyl benzene; vinyl aliphatic hydrocarbon monomers include alpha olefins such as ethylene, propylene, isobutylene, and cyclohexene as well as conjugated dienes such as 1,3-butadiene, methyl-2-butadiene, 1,3-piperylene, 2,3 dimethyl butadiene, isoprene, cyclohexane, cyclopentadiene, and dicyclopentadiene. Vinyl alkyl ethers include methyl vinyl ether, isopropyl vinyl ether, n-butyl vinyl ether, and isobutyl vinyl ether. Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl phenyl, and cresyl glycidyl ethers reacted with acrylic and methacrylic acids, hydroxyl alkyl acrylates and methacrylates such as hydroxyethyl and hydroxypropyl acrylates and methacrylates, as well as amino acrylates and methacrylates. Acrylic monomers can include very minor amounts of acrylic acids including acrylic and methacrylic acid, ethacrylic acid, alpha-chloroacrylic acid, alpha-cyanoacrylic acid, crotonic acid, beta-acryloxy propionic acid, and beta-styryl acrylic acid.

In other embodiments, polymers useful as component (a), the "binding polymer", of the latex paints are copolymerization products of a mixture of co-monomers which comprise monomers selected from styrene, methyl styrene, vinyl, or combinations thereof. In one embodiment, co-monomers comprise at least 40 mole percent of monomers selected from styrene, methyl styrene, or combinations thereof and at least 10 mole percent of one or more monomers selected from acrylates, methacrylates, and acrylonitrile. In another embodiment, the acrylates and methacrylates contain from 4 to 16 carbon atoms such as, for example, 2-ethylhexyl acrylate and methyl methacrylates. The monomers may be used in a proportion such that the final polymer has a glass-transition temperature (Tg) greater than 21° C. and less than 95° C. In one embodiment, the polymers have a weight-average molecular weight of at least 100,000.

In one embodiment, the binding polymer comprises interpolymerized units derived from 2-ethylhexyl acrylate. In another embodiment, the binding polymer comprises polymerized units comprising from 50 to 70 mole percent of units derived from styrene, methyl styrene, or combinations thereof from 10 to 30 mole percent of units derived from 2-ethylhexyl acrylate and from 10 to 30 mole percent of units derived from methyl acrylate, acrylonitrile, or combinations thereof.

Illustrative examples of suitable binding polymers include a copolymer whose interpolymerized units are derived from about 49 mole percent styrene, 11 mole percent alpha-methylstyrene, 22 mole percent 2-ethylhexyl acrylate, and 18 mole percent methyl methacrylates with a Tg of approximately 45° C. (available as Neocryl XA-6037 polymer emulsion from ICI Americas, Inc., Bridgewater, N.J.); a copolymer whose interpolymerized units are derived from about 51 mole percent styrene, 12 mole percent α-methylstyrene, 17 mole percent 2-ethylhexyl acrylate, and 19 mole percent methyl methacrylates with a Tg of approximately 44° C. (available as Joncryl 537 polymer emulsion from S.C. Johnson & Sons, Racine, Wis.); and a terpolymer whose interpolymerized units are derived from about 54 mole percent styrene, 23 mole percent 2-ethylhexyl acrylate, and 23 mole percent acrylonitrile with a Tg of approximately 44° C. (available as Carboset™ XPD-1468 polymer emulsion from B.F. Goodrich Co.). In one embodiment the binding polymer is Joncryl™ 537.

As described above, the aluminum phosphate compositions described herein can be used to formulate latex paints as a pigment, alone or in combination with another pigment.

Suitable additional hiding pigments include white opacifying hiding pigments and colored organic and inorganic pigments. Representative examples of suitable white opacifying hiding pigments include rutile and anatase titanium dioxides, lithopone, zinc sulfide, lead titanate, antimony oxide, zirconium oxide, barium sulfate, white lead, zinc oxide, leaded zinc oxide, and the like, and mixtures thereof. In one embodiment, white organic hiding pigment is rutile titanium dioxide. In another embodiment the white organic hiding pigment is rutile titanium dioxide having an average particle size between about 0.2 to 0.4 microns. Examples of colored organic pigments are phthalo blue and hansa yellow. Examples of colored inorganic pigments are red iron oxide, brown oxide, ochres, and umbers.

Most known latex paints contain thickeners to modify the rheological properties of the paint to ensure good spreading, handling, and application characteristics. Suitable thickeners include a non-cellulosic thickener, in one embodiment, an associative thickener; in another embodiment, a urethane associative thickener.

Associative thickeners such as, for example, hydrophobically modified alkali swellable acrylic copolymers and hydrophobically modified urethane copolymers generally impart more Newtonian rheology to emulsion paints compared to conventional thickeners such as, for example, cellulosic thickeners. Representative examples of suitable associative thickeners include polyacrylic acids (available, for example, from Rohm & Haas Co., Philadelphia, Pa., as Acrysol RM-825 and QR-708 Rheology Modifier) and activated attapulgite (available from Engelhard, Iselin, N.J. as Attagel 40).

Latex-paint films are formed by coalescence of the binding polymer to form a binding matrix at the ambient paint application temperature to form a hard, tack-tree film. Coalescing solvents aid the coalescence of the film-forming binder by lowering the film-forming temperature. The latex paints preferably contain a coalescing solvent. Representative examples of suitable coalescing solvents include 2-phenoxyethanol, diethylene glycol butyl ether, dibutyl phthalate, diethylene glycol, 2,2,4-trimethyl-1,1,3-pentanediol monoisobutyrate, and combinations thereof. In one embodiment, the coalescing solvent is diethylene glycol butyl ether (butyl carbitol) (available from Sigma-Aldrich, Milwaukee, Wis.) or 2,2,4-trimethyl-1,1,3-pentanediol monoisobutyrate (available from Eastman Chemical Co., Kingsport, Tenn., as Texanol), or combinations thereof.

Coalescing solvent is preferably utilized at a level between about 12 to 60 grams or about 40 grams of coalescing solvent per liter of latex paint or at about 20 to 30 weight percent based on the weight of the polymer solids in the paint.

The paints formulated in accordance with various embodiments provided herein can further comprise conventional materials used in paints such as, for example, plasticizer, anti-foam agent, pigment extender, pH adjuster, tinting color, and biocide. Such typical ingredients are listed, for example, in TECHNOLOGY OF PAINTS, VARNISHES AND LACQUERS, edited by C. R. Martens, R. E. Kreiger Publishing Co., p. 515 (1974).

Paints are commonly formulated with "functional extenders" to increase coverage, reduce cost, achieve durability, alter appearance, control rheology, and influence other desirable properties. Examples of functional extenders include, for example, barium sulfate, calcium carbonate, clay, gypsum, silica, and talc.

The most common functional extenders for interior flat paints are clays. Clays have a number of properties that make them desirable. Inexpensive calcined clays, for example, are useful in controlling low-shear viscosity and have a large internal surface area, which contributes to "dry hide". But, this surface area is also available to trap stains.

Because of their tendency to absorb stains, it is preferable that calcined clays are used in the paints only in the small amounts required for rheology control, for example, typically as less than about half of the total extender pigment, or are not used at all. The exemplary extenders for use in the paints described herein are calcium carbonates; that in certain embodiments, are ultra-fine ground calcium carbonates such as, for example, Opacimite (available from ECC International, Sylacauga, Ala.), Supermite (available from Imerys, Roswell, Ga.), or others having particle size of approximately 1.0 to 1.2 microns. Ultra-fine calcium carbonate help to space titanium dioxide optimally for hide (see, for example, K. A. Haagenson, "The effect of extender particle size on the hiding properties of an interior latex flat paint," American Paint & Coatings Journal, Apr. 4, 1988, pp. 89-94).

The latex paints formulated in accordance with various embodiments described herein can be prepared utilizing conventional techniques. For example, some of the paint ingredients are generally blended together under high shear to form a mixture commonly referred to as "the grind" by paint formulators. The consistency of this mixture is comparable to that of mud, which is desirable in order to efficiently disperse the ingredients with a high shear stirrer. During the preparation of the grind, high shear energy is used to break apart agglomerated pigment particles.

The ingredients not included in the grind are commonly referred to as "the letdown." The letdown is usually much less viscous than the grind, and is usually used to dilute the grind to obtain a final paint with the proper consistency. The final mixing of the grind with the letdown is typically carried out with low shear mixing.

Most polymer latexes are not shear stable, and therefore are not used as a component of the grind. Incorporation of shear unstable latexes in the grind can result in coagulation of the latex, yielding a lumpy paint with no, or little, film-forming capability. Consequently paints are generally prepared by adding the latex polymer in the letdown. However, some paints formulated in accordance with various embodiments described herein contain latex polymers that are generally shear stable. Therefore, the latex paints can be prepared by incorporating some or all of the latex polymer into the grind. In one embodiment, at least some of the latex polymer is put in the grind.

The examples of compositions according to various embodiments described above are presented below. Again, one of skill in the art will recognize variants that may be utilized in the compositions described herein. The following examples are presented to exemplify embodiments of the claimed subject matter. All numerical values are approximate. When numerical ranges are given, it should be understood that embodiments outside the stated ranges may still fall within the scope of the invention. Specific details described in each example should not be construed as necessary features of the invention.

EXAMPLES

Example 1

Preparation of Aluminum Phosphate Powder 791 g of phosphoric acid (81.9% wt $H_3PO_4$ or 59.3% wt $P_2O_5$) were reacted with 189 g of hydrated aluminum hydroxide (85.3% wt $Al(OH)_3$ or 58.1% wt $Al_2O_3$) in 210 g of water at 80° C. for 1 h (final molar ratio P/Al=2.99) to obtain an acidic aluminum phosphate solution. In the second step, 1155 g of commercial purified sodium aluminate solution (9.7% wt Al and 11.2% wt Na or 18.3% wt $Al_2O_3$ and 15.7% wt $Na_2O$, final Na/Al=1.36) were added simultaneously with acidic aluminum phosphate solution to a stirred vessel loaded with 1500 g of water at room temperature.

The final reaction pH was 7.1 and temperature during the reaction was kept at 45° C. The resulting dispersion was centrifuged (30 min, 2500 rpm—relative centrifugal force: 1822 g) to remove the reaction liquor, forming a cake that was washed with water once (1000 g of washing water) to give a white wet cake (3300 g) with 27.0% wt non-volatiles content (902 g on dry basis following ASTM D 280) and pH 7.3. The slurry was spray-dried yielding 1090 g of aluminum phosphate powder (ca 83% wt non-volatiles content).

Example 2

Preparation of Aluminum Phosphate Powder

In this example, 535.0 kg of aluminum phosphate was prepared. The wet product was dried in a "turbo-dryer" and presented characteristics of hollow particles with 15% humidity and P:Al (phosphorus:aluminum) ratio of 1:1.50.

40.0 kg of fertilizer phosphoric acid containing 55.0% of $P_2O_5$ was used. In the initial preparation phase, the acid discoloration was carried out, which lasted approximately thirty minutes, at a temperature of 85° C. For this phase, a solution with 8.70 kg of hydrogen peroxide containing around 50% of $H_2O_2$ was added to the acid. Then, the acid was diluted with 975.0 kg of process water, cooled to a temperature of 40° C. and then stored at the concentration of 27.0% of $P_2O_5$.

The aluminum source employed in this application was a commercial aluminum sulfate solution containing 28% of $Al_2O_3$. The solution was filtered and diluted with process water. Specifically, 884.30 kg of aluminum sulfate solution and 1,776.31 kg of process water was combined to create a solution of approximately 9.30% $Al_2O_3$.

This particular experiment used a diluted solution of commercial sodium hydroxide containing 20.0% of NaOH as a neutralizing reagent. Specifically, 974.0 kg of sodium hydroxide solution with 50% of NaOH and 1,461.0 kg of process water were mixed. The final mixture was cooled to 40° C.

The three reagents were mixed simultaneously, for approximately 30 minutes, in a reactor with 7,500 liters. During the addition of the reagents in the reactor, the mixture temperature was kept in the 40° C. to 45° C. range, the pH was controlled to stay in a range of 4.0 to 4.5. At the end of the addition of reagents, the mixture was kept sloshing for approximately 15 minutes. The pH at this point was controlled at approximately 5.0 with the addition of a sodium hydroxide solution containing 5.0% of NaOH. The resulting suspension was approximately 7,000 kg with a density of 1.15 g/cm³, presented 6.5% of solids, which represent around 455.0 kg of precipitate.

Then, the suspension was filtered in a press-filter resulting in 1,300 kg of wet cake and 5,700 kg of filtrate. The filtrate consisted primarily of a sodium sulfate solution ($Na_2SO_4$). The cake consisted of approximately 35% solids. The cake was washed, directly in the press filter, with 3,860 liters of process water, at room temperature, being kept at a washing ratio of approximately 8.5 cm³ of the washing solution per ton of dry cake. The filtrate generated in the washing of the cake was stored for optional future use or for effluent treatment. The cake extracted from the filter, around 1,300 kg, was then transferred to a disperser (of approximately 1,000 liters) through a conveyor belt. The dispersion, containing approximately 35% of solids, had a density of 1.33 g/cm³ and viscosity of 80-200 cPs and it could be used as a slurry for making paint.

The dispersed aluminum phosphate suspension, with approximately 35% of solids, was then pumped to a turbo-drier. The product was heated through a hot air stream, at a temperature of 135° C. Approximately 535.0 kg of aluminum orthophosphate with 15% of humidity was produced. The final product was micronized and its granulometry was kept below the 400 mesh. The final analysis of the dry product presented the following results: the phosphorus content in the product was approximately 20.2%; the aluminum content was approximately 13.9%; the sodium content was approximately 6.9% and the pH of the aqueous dispersion was approximately 7.0; the water content was approximately 15%; the skeletal density of 2.20 g/cm³, and average diameter of powder particles was from 5 to 10 µm.

Example 3

Preparation of Aluminum Phosphate Slurry Containing 51 wt. % Aluminum Phosphate and Viscosity Measurements A stock slurry containing 37.2 wt % non-volatiles content and an aluminum phosphate stock powder containing 85.5 wt % non-volatiles were used with the following dispersants in various amounts to prepare aluminum phosphate slurry samples containing 51 wt. % and >51 wt. % aluminum phosphate:
 i. Tetrasodium pyrophosphate (TSPP), $Na_4P_2O_7$,
 ii. Sodium hexametaphosphate, $Na(PO_3)_x$, Nuclear.
 iii. Pentasodium triphosphate, $Na_5P_3O_{10}$, Merck.
 iv. Trisodium phosphate dodecahydrate, $Na_3PO_4$, Merck.
 v. Tetrapotassium pyrophosphate (TKPP), $K_4P_2O_7$,
 vi. Sodium potassium triphosphate, $K_{4.65}Na_{0.35}P_3O_{10}$, prepared from (iii) using ion exchange resin (Dowex 50WX4-400).

Solubility of the phosphate dispersants in water (wt %) at 20-25° C. is provided in Table 2 below:

TABLE 2

Phosphate dispersants solubility in water

| Dispersant | Water solubility (wt %) at 20-25° C. |
|---|---|
| Tetrasodium pyrophosphate | 5-6[a] |
| Sodium hexametaphosphate | 20-30[b] |
| Pentasodium triphosphate | 13-15[a] |
| Trisodium phosphate dodecahydrate | 25[b] |
| Tetrapotassium pyrophosphate | 60[b] |

[a]Ullmann's Encyclopedia of Industrial Chemistry.
[b]Determined using standard methods Slurry Preparation A) 51 wt % Aluminum Phosphate Slurry Without Dispersant 52.0 g of aluminum phosphate stock powder were slowly added to 140.0 g of aluminum phosphate stock slurry. Mixing was done using a Cowles disperser with stirring velocity at 730±30 rpm, powder addition took about 25 minutes and final mixture was further stirred for 15 minutes.

B) 51 wt % Aluminum Phosphate Slurries with Dispersant

The dispersant stock solutions were prepared by dissolving each phosphate salt in distilled water to yield the following concentrations:

5.0 wt % tetrasodium pyrophosphate, 20 wt % sodium hexametaphosphate, 11 wt % pentasodium triphosphate, 7.7 wt % trisodium phosphate dodecahydrate, 50 wt % tetrapotassium pyrophosphate, and 8 wt % sodium potassium triphosphate.

Phosphate dispersant solutions were added to stock aluminum phosphate slurry to achieve the desired dispersant concentration. Then, aluminum phosphate powder was added to aluminum phosphate-dispersant slurry. Amounts of all components used to prepare 51% aluminum phosphate slurry are listed in the Table 3 and 4.

TABLE 3

Aluminum phosphate slurry compositions with various dispersants:

| Dispersant | Dispersant concentration in 51% aluminum phosphate slurry (wt %) | Aluminum phosphate slurry stock | Dispersant solution amount (g) | Aluminum phosphate powder amount (g) | Total weight (g) |
|---|---|---|---|---|---|
| $Na_3PO_4$ | 0.24 | 150.00 | 7.50 | 82.50 | 240.00 |
| | 0.50 | 200.00 | 23.00 | 129.00 | 352.00 |
| $Na_4P_2O_7$ | 0.10 | 100.00 | 3.00 | 49.00 | 152.00 |
| | 0.27 | 140.00 | 12.00 | 70.00 | 222.00 |
| | 0.50 | 140.00 | 26.00 | 94.00 | 260.00 |
| | 0.97 | 140.00 | 70.00 | 150.00 | 360.00 |
| | 1.49 | 70.00 | 100.00 | 165.00 | 335.00 |
| $K_4P_2O_7$ | 0.25 | 100.00 | 0.72 | 46.00 | 146.72 |
| | 0.51 | 100.00 | 1.50 | 47.00 | 148.50 |
| | 0.99 | 100.00 | 3.00 | 49.00 | 152.00 |
| | 1.54 | 100.00 | 4.80 | 51.50 | 156.30 |
| $Na_5P_3O_{10}$ | 0.10 | 100.00 | 1.50 | 47.00 | 148.50 |
| | 0.25 | 150.00 | 5.50 | 80.00 | 235.50 |
| | 0.53 | 150.00 | 12.50 | 95.00 | 257.50 |
| | 0.99 | 150.00 | 26.00 | 110.00 | 286.00 |
| | 1.52 | 100.00 | 31.50 | 94.50 | 226.00 |
| | 3.06 | 20.00 | 34.00 | 57.00 | 111.00 |
| $K_{4.65}Na_{0.35}P_3O_{10}$ | 0.10 | 100.00 | 47.00 | 1.20 | 148.20 |
| | 0.24 | 100.00 | 49.00 | 3.10 | 152.10 |
| | 0.52 | 100.00 | 55.00 | 7.00 | 162.00 |
| | 0.99 | 100.00 | 66.00 | 15.00 | 181.00 |
| | 1.51 | 100.00 | 81.00 | 26.00 | 207.00 |
| | 3.02 | 50.00 | 87.00 | 46.00 | 183.00 |
| $Na(PO_3)_x$ | 0.10 | 135.00 | 1.00 | 63.00 | 199.00 |
| | 0.29 | 140.00 | 2.60 | 34.00 | 176.60 |
| | 0.49 | 140.00 | 5.00 | 60.00 | 205.00 |
| | 1.00 | 140.00 | 11.00 | 70.00 | 221.00 |
| | 1.51 | 140.00 | 18.00 | 80.00 | 238.00 |
| | 3.04 | 100.00 | 35.00 | 95.00 | 230.00 |

TABLE 4

Aluminum phosphate slurry compositions with dispersant mixtures:

| Dispersant mixture | Dispersant concentration in 51% Aluminum phosphate slurry (wt %) | | Aluminum phosphate slurry stock | Dispersant solution amount (g) | | Aluminum phosphate powder amount (g) | Total weight (g) |
|---|---|---|---|---|---|---|---|
| | $Na_5P_3O_{10}$ | $Na(PO_3)_x$ | | $Na_5P_3O_{10}$ | $Na(PO_3)_x$ | | |
| A | 0.98 | 0.49 | 100.00 | 20.00 | 5.00 | 80.00 | 205.00 |
| B | 0.50 | 0.99 | 100.00 | 9.40 | 9.40 | 71.00 | 189.80 |

TABLE 5

Slurry compositions with >51 wt % aluminum phosphate

| Aluminum phosphate concentration in the final slurry (wt %) | Dispersant concentration in aluminum phosphate slurry (wt %) | Aluminum phosphate slurry stock amount (g) | Dispersant solution amount (g) | Aluminum phosphate powder amount (g) | Total weight (g) |
|---|---|---|---|---|---|
| 54.17 | 0.99 | 100.00 | 21.00 | 90.50 | 211.50 |
| 53.85 | 1.51 | 100.00 | 39.00 | 119.00 | 258.00 |
| 55.71 | 0.98 | 100.00 | 19.70 | 99.00 | 218.70 |
| 55.45 | 1.51 | 100.00 | 37.00 | 129.00 | 266.00 |

Viscosity Measurements

Viscosity of 51% aluminum phosphate slurry compositions was measured using a Rheoterm 115 Rheometer (Contraves). 51% aluminum phosphate slurry samples were stirred for 15 min, using a Cowles disperser, with stirring velocity set at 730±30 rpm. Then, the sample was added to a coaxial cylindrical geometry vessel and the spindle was placed within the vessel. The sample was left standing for 1 hour at 25° C. Then, the viscosity readings were made at 100, 300 and 500 $s^{-1}$ shear rates and provided in Tables 6 and 7.

TABLE 6

Viscosity and sedimentation behavior of 51% aluminum phosphate slurry compositions prepared with various dispersants

| Dispersant | 51% slurry | | | | |
|---|---|---|---|---|---|
| | Concentration (wt %) | Sedimentation (%)[1,2] | Viscosity (cPs) | | |
| | | | $100\ s^{-1}$ | $300\ s^{-1}$ | $500\ s^{-1}$ |
| None | 0 | 0 | 2064 ± 177 | 1334 ± 103 | 1084 ± 167 |
| $Na_3PO_4$ | 0.25 | 0 | 1780 | 1130 | 982 |
| | 0.5 | 0 | 2064 | 1273 | 1024 |
| $Na_4P_2O_7$ | 0.10 | 0 | 1805 | 1068 | 871 |
| | 0.25 | 0 | 1406 ± 411 | 877 ± 225 | 705 ± 206 |
| | 0.5 | 0 | 1406 ± 193 | 813 ± 102 | 609 ± 101 |
| | 1.0 | 0 | 1813 ± 378 | 1050 ± 93 | 698 ± 27 |
| | 1.5 | 0 | 1890 ± 186 | 1017 ± 44 | 697 ± 6 |
| $K_4P_2O_7$ | 0.25 | 0 | 2139 | 1343 | 1097 |
| | 0.5 | 0 | 1888 | 1183 | 939 |
| | 1.0 | 0 | 1312 | 670 | 553 |
| | 1.5 | 0 | 2774 | 1396 | 1051 |
| $Na_5P_3O_{10}$ | 0.10 | 0 | 1963 | 1174 | 966 |
| | 0.25 | 0 | 1361 ± 165 | 843 ± 89 | 649 ± 89 |
| | 0.5 | 0 | 927 ± 224 | 662 ± 81 | 508 ± 50 |
| | 1.0 | 60 | 760 | 462 | 393 |
| | 1.5 | 55 | 576 | 583 | 425 |
| | 3.0 | 96 | 585 | 465 | 376 |
| $K_{4.65}Na_{0.35}P_3O_{10}$ | 0.10 | 0 | 2164 | 1219 | 954 |
| | 0.25 | 0 | 1629 | 956 | 797 |
| | 0.5 | 0 | 1855 | 961 | 662 |
| | 1.0 | 0 | 927 | 704 | 561 |
| | 1.5 | 24 | 801 | 633 | 509 |
| | 3.0 | 74 | 727 | 575 | 460 |

TABLE 6-continued

Viscosity and sedimentation behavior of 51% aluminum phosphate slurry compositions prepared with various dispersants

| Dispersant | | Concentration (wt %) | Sedimentation (%)[1,2] | 51% slurry Viscosity (cPs) | | |
|---|---|---|---|---|---|---|
| | | | | 100 s$^{-1}$ | 300 s$^{-1}$ | 500 s$^{-1}$ |
| Na(PO$_3$)$_x$ | | 0.10 | 0 | 2047 | 1155 | 893 |
| | | 0.25 | 0 | 1152 ± 44 | 802 ± 58 | 680 ± 47 |
| | | 0.5 | 0 | 965 ± 135 | 604 ± 81 | 475 ± 54 |
| | | 1.0 | 0 | 1044 ± 295 | 660 ± 196 | 500 ± 152 |
| | | 1.5 | 0 | 973 ± 76 | 591 ± 67 | 456 ± 40 |
| | | 3.0 | 0 | 2523 | 1236 | 893 |
| Na$_5$P$_3$O$_{10}$ + | A[3] | 1.5 (total) | 0 | 1161 | 852 | 681 |
| Na(PO$_3$)$_x$ | B[4] | 1.5 (total) | 0 | 1872 | 1359 | 1023 |

[1]After 3 hours standing at room temperature (23 ± 2° C.).
[2]% of height occupied by sediment.
[3]Na$_5$P$_3$O$_{10}$ (0.98 wt %) and Na(PO$_3$)x (0.49 wt %).
[4]Na$_5$P$_3$O$_{10}$ (0.50 wt %) and Na(PO$_3$)x (0.99 wt %).

TABLE 7

Viscosity and sedimentation behavior of slurry compositions comprising >51% aluminum phosphate prepared with pentasodium triphosphate dispersants

| Aluminum phosphate concentration in the final slurry (wt %) | Dispersant concentration in aluminum phosphate slurry (wt %) | Sedimentation % | Viscosity (cPs) | | |
|---|---|---|---|---|---|
| | | | 100 s$^{-1}$ | 300 s$^{-1}$ | 500 s$^{-1}$ |
| 54.17 | 0.99 | 0 | 2874 | 1682 | 1218 |
| 53.85 | 1.51 | 0 | 1308 | 914 | 757 |
| 55.71 | 0.98 | 0 | 3693 | 1926 | 1437 |
| 55.45 | 1.51 | 0 | 5623 | 2405 | 1687 |

As seen from the data in Tables 6-7 and FIG. 1, sodium hexametaphosphate and pentasodium triphosphate dispersants produced lower viscosities for 51 wt % aluminum phosphate slurry. Most samples upon standing underwent gel formation, but the gels formed were much weaker than the gel formed in 51 wt % Aluminum phosphate slurry without dispersant. The gels formed did not flow under gravity but they were easily thinned when sheared. Sodium potassium triphosphate, K$_{4.65}$Na$_{0.35}$P$_3$O$_{10}$, also produced lower viscosity for 51% aluminum phosphate slurry with two benefits: (i) no sedimentation at 1 wt % concentration, and (ii) the formed gel was much weaker than the slurry with pentasodium triphosphate. In the case of 51 wt % aluminum phosphate slurry with Na$_5$P$_3$O$_{10}$ and K$_{4.65}$Na$_{0.35}$P$_3$O$_{10}$, at higher dispersant concentration, the viscosity reduction was excessive, allowing the formation of packed sediment.

The increase of solid content in slurry composition with Na$_5$P$_3$O$_{10}$ seemed to avoid sedimentation but the viscosity increased considerably and the slurry turned to a gel that was not easily thinned. In certain embodiments, the highest useful concentration of aluminum phosphate in the slurry is about 54 weight % with about 1.5 weight % Na$_5$P$_3$O$_{10}$ (second line, Table 7).

Figure 2:
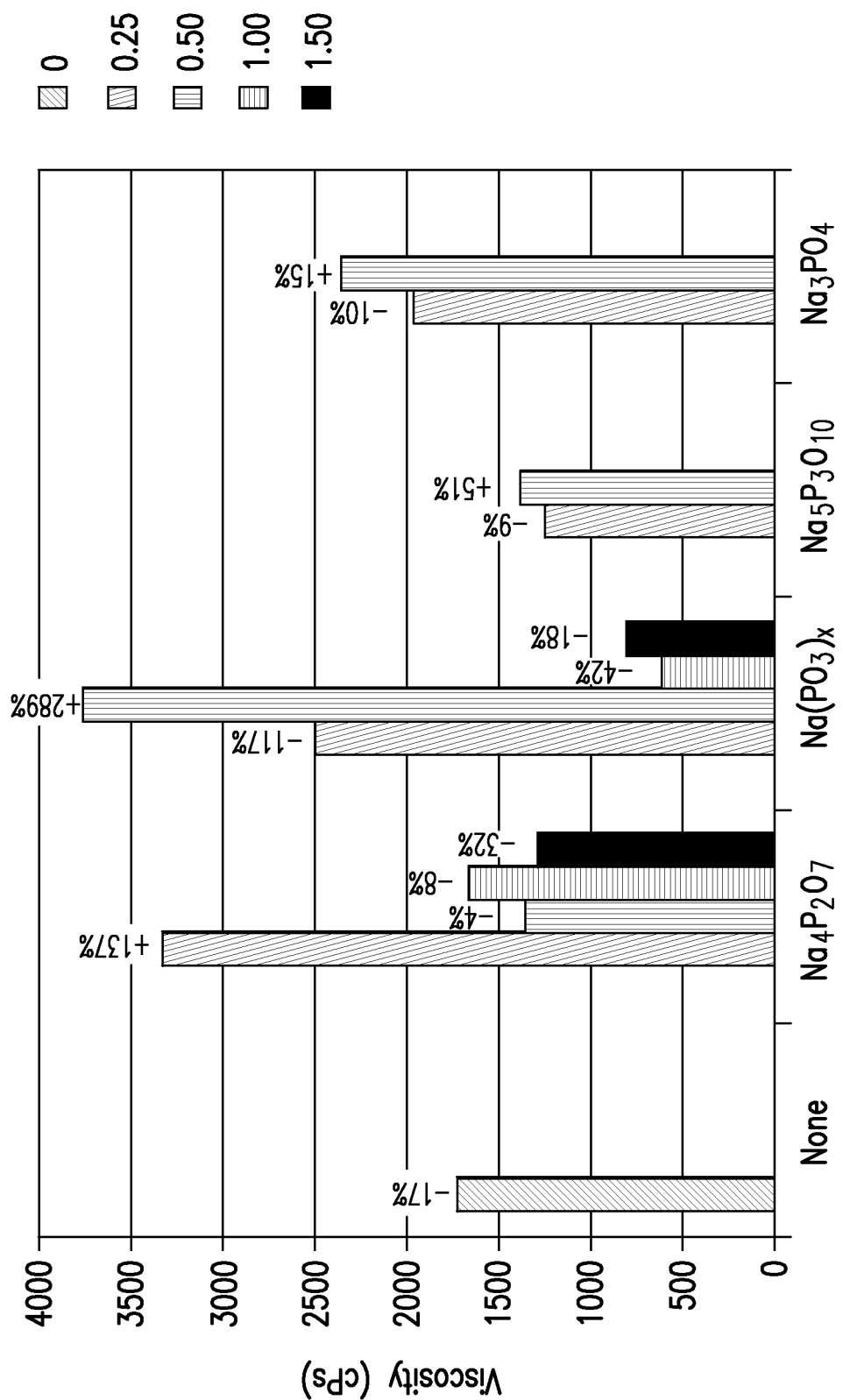
FIG. 2: Illustrates effects of dispersant type and concentration on 51% aluminum phosphate slurry viscosities at 100 s$^{-1}$ after 3 weeks at room temperature (24±2° C.).

Most of the 51 wt % slurries analyzed had their viscosities increased after accelerated ageing tests (7 days at 54° C.); however, the viscosity was still the highest for the slurry without dispersant. Slurry compositions with Na(PO$_3$)x at 1.0 and 1.5 wt % did not show significant increase in viscosity after aging test. Slurries after 3 weeks at room temperature (see, FIG. 2) did not show any correlation with the accelerated tests in the oven (7 days at 54° C.).

The 51 wt % slurry composition without dispersant decreases its viscosity after preparation and the slurries with lower dispersant concentration (0.25 and 0.50%) tend to increase their viscosities with time except Na$_5$P$_3$O$_{10}$ that keeps its initial value. On the other hand, in the 51 wt % slurries with tetrasodium pyrophosphate and Na(PO$_3$)x at higher concentration (1.0 and 1.5%), the viscosities tend to decrease from initial value.

In certain embodiments, the viscosity range suitable to prepare 51% aluminum phosphate slurry is from 900 to 1150 cPs. At this range, a weak gel is formed in the slurries upon standing and sedimentation is not observed.

In a typical paint dry film, the pigment and filler particles are dispersed in the resin film. The hiding power is largely dependent on the particle refractive indices and sizes. As mentioned titanium dioxide is currently the standard white pigment because of its large refractive index and of the absence of light absorption in the visible region. A dry film of a paint formulated with the aluminum phosphate compositions in some embodiments provided herein has several differences from the typical paint dry film. First, the film with the aluminum phosphate is not just a resin film. It is rather formed by enmeshed resin and aluminum phosphate. It is thus a nanocomposite film that combines two interpenetrating phases with different properties to achieve synergistic benefits, concerning film mechanical properties and resistance to water and to other aggressive agents. Second, good film hiding power is obtained at lower titanium dioxide contents, because the film contains a large amount of closed pores that scatter light. Moreover, if a titanium dioxide particle is adjacent to one of these voids, it will scatter much more than if it is fully surrounded by resin, due to the larger refractive index gradient. This creates a synergism between the novel aluminum phosphate and titanium dioxide, as far as the hiding power is concerned.

In tests comparing a standard paint dry film to a film with aluminum phosphate, a standard market formulation of a semi-matt acrylic paint is chosen and titanium dioxide is progressively replaced by the aluminum phosphate product. Water content and other paint components are adjusted as required. Several of the modifications in the formula in this embodiment are related to a decreased use of thickener/rheology modifier, dispersant, acrylic resin and coalescing agent.

As demonstrated above, embodiments described herein provide a compositions comprising aluminum phosphate slurry comprising about 40-70% non-volatiles and one or more dispersants.

While the subject matter has been described with respect to a limited number of embodiments, the specific features of one embodiment should not be attributed to other embodiments of the invention. No single embodiment is representative of all aspects of the invention. In some embodiments, the compositions or methods may include numerous compounds or steps not mentioned herein. In other embodiments, the compositions or methods do not include, or are substantially free of, any compounds or steps not enumerated herein. Variations and modifications from the described embodiments exist. The method of making the resins or pigments is described as comprising a number of acts or steps. These steps or acts may be practiced in any sequence or order unless otherwise indicated. Finally, any number disclosed herein should be construed to mean approximate, regardless of whether the word "about" or "approximately" is used in describing the number. The appended claims intend to cover all those modifications and variations as falling within the scope of the invention.

What is claimed is:

1. A slurry consisting of a pigment as combined with a dispersant and a solvent, wherein the pigment consists of amorphous aluminum orthophosphate particles, wherein the amorphous aluminum orthophosphate particle concentration is about 50 to about 60 weight % and the dispersant concentration is about 0.1 to 3 weight % based on the total weight of the slurry, wherein the dispersant is selected from the group consisting of tetrasodium pyrophosphate, pentasodium triphosphate, trisodium phosphate dodecahydrate, tetrapotassium pyrophosphate, sodium potassium triphosphate, a borate dispersant, a silicate dispersant, and combinations thereof, wherein the amorphous aluminum orthophosphate particles are free of titanium dioxide.

2. The slurry of claim 1, wherein the dispersant concentration is less than about 2 weight % based on the total weight of the slurry.

3. The slurry of claim 1, wherein the dispersant concentration is less than about 1 weight % based on the total weight of the slurry.

4. The slurry of claim 1, wherein the dispersant concentration is about 0.1 to about 1 weight % based on the total weight of the slurry.

5. The slurry of claim 1, wherein the dispersant concentration is about 0.25 to about 1 weight % based on the total weight of the slurry.

6. The slurry of claim 1, wherein the dispersant concentration is about 0.25, 0.5, 0.75 or 1 weight % based on the total weight of the slurry.

7. The slurry of claim 1, wherein the amorphous aluminum orthophosphate concentration is about 51 weight % based on the total weight of the slurry, wherein the dispersants are selected from the group consisting of tetrasodium pyrophosphate, pentasodium triphosphate, trisodium phosphate dodecahydrate, tetrapotassium pyrophosphate, sodium potassium triphosphate, wherein the dispersant concentration is between 0.1 to 3 weight % based on the total weight of the slurry, and wherein the slurry has a viscosity of approximately 576 cPs to 2,774 cPs at 100 s$^{-1}$, 462 cPs to 1,396 cPs at 300 s$^{-1}$, and 376 cPs to 1,097 cPs at 500 s$^{-1}$.

8. The slurry of claim 7, wherein the dispersant is pentasodium triphosphate, and the slurry has a viscosity from about 576 cPs to 1,963 cPs measured at 100 s$^{-1}$.

9. The slurry of claim 7, wherein the dispersant is pentasodium triphosphate, and the slurry has a viscosity from about 462 cPs to 1,174 cPs measured at 300 s$^{-1}$.

10. The slurry of claim 1, wherein the amorphous aluminum orthophosphate particles are characterized by a skeletal density of about 1.73-2.40 g/cm$^3$.

11. The slurry of claim 1, wherein the amorphous aluminum orthophosphate particles are characterized by a skeletal density of less than about 1.95, 1.98, 2.00, or 2.25 g/cm$^3$.

12. The slurry of claim 1, wherein the amorphous aluminum orthophosphate is characterized by phosphorus to aluminum mole ratio of about 0.65 to 1.75.

13. The slurry of claim 1, wherein the amorphous aluminum orthophosphate is characterized by phosphorus to aluminum mole ratio of about 0.5 to 1.5.

14. The slurry of claim 1, wherein the amorphous aluminum orthophosphate is characterized by phosphorus to aluminum mole ratio of about 0.8 to 1.3.

15. The slurry of claim 1, wherein the amorphous aluminum orthophosphate is characterized by phosphorus to aluminum mole ratio of about 1.

16. The slurry of claim 1, wherein the amorphous aluminum orthophosphate is characterized by an average individual particle radius size of between about 5 and 80 nanometers.

17. The slurry of claim 7, wherein the dispersant is pentasodium triphosphate, and the slurry has viscosity from about 376 cPs to 966 cPs measured at 500 s$^{-1}$.

18. The slurry of claim 1, wherein the amorphous aluminum orthophosphate further comprises an ion.

19. The slurry of claim 18, wherein the ion is sodium.

20. The slurry of claim 18, wherein the ion is selected from calcium, potassium, borate and ammonium.

21. A slurry comprising an opacifying pigment formed of amorphous aluminum orthophosphate particles, and a dispersant, wherein the amorphous aluminum orthophosphate concentration is about 40 to about 70 weight % and the dispersant concentration is from about 0.1 to 3.5 weight % based on the total weight of the slurry, wherein the dispersant is selected from the group consisting of a borate dispersant, a silicate dispersant, and combinations thereof.

22. A slurry consisting of opacifying pigment particles and a dispersant in water, wherein the opacifying pigment is amorphous aluminum orthophosphate, wherein the dispersant is pentasodium triphosphate present in a concentration of from 0.1 to 3 weight percent, wherein the slurry has a viscosity of from about 576 to 1,963 cPs at 100 s$^{-1}$, 462 to 1,174 cPs at 300 s$^{-1}$, and 376 to 966 cPs at 500 s$^{-1}$ when the slurry comprises 51 percent by weight amorphous aluminum orthophosphate particles based on the total weight of the slurry one hour after stirring and at 25° C.

23. A coating composition comprising a slurry combined with a binding polymer, wherein the slurry consists of an opacifying pigment in the form of amorphous aluminum orthophosphate particles, a dispersant, and water, wherein the dispersant is pentasodium triphosphate.

24. The slurry as recited in claim 1 wherein the slurry comprises 51 percent by weight of the amorphous aluminum orthophosphate particles, the dispersant is pentasodium triphosphate, and the viscosity of the slurry is from about 576 to 1963 cPs at 100 s$^{-1}$, 462 to 1174 cPs at 300 s$^{-1}$, and 376 to 966 at 500 s$^{-1}$ one hour after stirring and at 25° C.

25. The slurry as recited in claim 1 wherein the slurry comprises 53.85 to 55.71 weight % of the amorphous aluminum orthophosphate particles, wherein the dispersant is pentasodium triphosphate and the dispersant concentration is between 0.98 to 1.51 weight %, and wherein the slurry and has a viscosity of from 1308 cPs to 5,612 at 100 s$^{-1}$, 914 to 2,405 cPs at 300 s$^{-1}$, and 757 to 1,687 cPs at 500 s$^{-1}$ one hour after stirring and at 25° C.

26. The slurry as recited in claim 22 wherein the viscosity of the slurry is 576 cPs at 1.5 weight % dispersant concentration and 1963 cPs at 0.1 weight % dispersant concentration at 100 s$^{-1}$, 462 cPs at 1 weight % dispersant concentration and 1174 cPs at 0.1 weight % dispersant concentration at 300 s$^{-1}$, and 376 cPs at 3 weight % dispersant concentration and 966 cPs at 0.1 weight % dispersant concentration at 500 s$^{-1}$ one hour after stirring and at 25° C.

27. The coating composition as recited in claim 23 wherein the slurry comprises 51 percent by weight of the amorphous aluminum orthophosphate particles, and the viscosity of the slurry is from about 576 to 1963 cPs at 100 s$^{-1}$, 462 to 1174 cPs at 300 s$^{-1}$, and 376 to 966 cPs at 500 s$^{-1}$ one hour after stirring and at 25° C.

28. The coating composition as recited in claim 23 wherein the slurry comprises an amorphous aluminum orthophosphate concentration of from 53.85 to 55.71 wt % based on the total weight of the slurry, and has a viscosity of from 1308 to 5,623 cPs at 100 s$^{-1}$, from 914 to 2,405 cPs at 300 s$^{-1}$, and from 757 to 1,687 cPs at 500 s$^{-1}$ one hour after stirring and at 25° C.

29. A slurry consisting of an opacifying pigment, a dispersant, and water, the opacifying pigment comprising amorphous aluminum orthophosphate particles, the dispersant selected from the group consisting of tetrasodium pyrophosphate, pentasodium triphosphate, trisodium phosphate dodecahydrate, tetrapotassium pyrophosphate, sodium potassium triphosphate, a borate dispersant, a silicate dispersant, and combinations thereof, the slurry having a dispersant concentration from 0.1 to 3 weight %, an opacifying pigment concentration of from 40 to 70 weight %, and having a viscosity of from about 300 cPs to about 3,500 cPs measured from 100 s$^{-1}$ to 500 s$^{-1}$ shear rates.

30. The slurry as recited in claim 29 having a viscosity of from about 550 cPs to about 3,000 cPs at 100 s$^{-1}$.

31. The slurry as recited in claim 29 having a viscosity of from 576 cPs to 1,963 cPs at 100 s$^{-1}$, wherein the dispersant is pentasodium triphosphate and the amorphous aluminum orthophosphate particle concentration in the slurry is 51 weight %.

32. The slurry as recited in claim 29 having a viscosity of from 465 cPs to 1,174 cPs at 300 s$^{-1}$, wherein the dispersant is pentasodium triphosphate and the amorphous aluminum orthophosphate particle concentration in the slurry is 51 weight %.

33. The slurry as recited in claim 29 having a viscosity of from 376 cPs to 966 cPs at 500 s$^{-1}$, wherein the dispersant is pentasodium triphosphate and the amorphous aluminum orthophosphate particle concentration in the slurry is 51 weight %.

34. The slurry as recited in claim 29 having a viscosity of from 1,308 cPs to 5,623 cPs at 100 s$^{-1}$, wherein the dispersant is pentasodium triphosphate and the amorphous aluminum orthophosphate particle concentration in the slurry is greater than 51 weight %.

35. The slurry as recited in claim 29 having a viscosity of from 914 cPs to 2,405 cPs at 300 s$^{-1}$, wherein the dispersant is pentasodium triphosphate and the amorphous aluminum orthophosphate particle concentration in the slurry is greater than 51 weight %.

36. The slurry as recited in claim 29 having a viscosity of from 757 cPs to 1,687 cPs at 500 s$^{-1}$, wherein the dispersant is pentasodium triphosphate and the amorphous aluminum orthophosphate particle concentration in the slurry is greater than 51 weight %.

* * * * *